(12) United States Patent
Boone, Jr. et al.

(10) Patent No.: US 11,902,101 B2
(45) Date of Patent: Feb. 13, 2024

(54) NOTIFICATION MANAGEMENT SYSTEMS AND METHODS

(71) Applicant: Simetric, Inc., Alpharetta, GA (US)

(72) Inventors: Richard A. Boone, Jr., Alpharetta, GA (US); Sanjay Srivastava, Redmond, WA (US)

(73) Assignee: Simetric, Inc., Alpharetta, GA (US)

( * ) Notice: Subject to any disclaimer, the term of this patent is extended or adjusted under 35 U.S.C. 154(b) by 0 days.

(21) Appl. No.: 17/408,207

(22) Filed: Aug. 20, 2021

(65) Prior Publication Data

US 2022/0060386 A1 Feb. 24, 2022

Related U.S. Application Data

(60) Provisional application No. 63/068,334, filed on Aug. 20, 2020.

(51) Int. Cl.
| | |
|---|---|
| *G06F 15/173* | (2006.01) |
| *H04L 41/14* | (2022.01) |
| *G06F 9/48* | (2006.01) |
| *G06F 9/52* | (2006.01) |
| *G06F 11/30* | (2006.01) |
| *G06F 11/32* | (2006.01) |
| *H04M 15/00* | (2006.01) |
| *H04W 4/24* | (2018.01) |
| *H04L 51/224* | (2022.01) |
| *G16Y 20/10* | (2020.01) |

(52) U.S. Cl.
CPC .......... *H04L 41/14* (2013.01); *G06F 9/4881* (2013.01); *G06F 9/52* (2013.01); *G06F 11/3006* (2013.01); *G06F 11/328* (2013.01); *H04L 51/224* (2022.05); *H04M 15/80* (2013.01); *H04W 4/24* (2013.01); *G16Y 20/10* (2020.01)

(58) Field of Classification Search
CPC ....... H04L 41/14; H04L 51/24; G06F 9/4881; G06F 9/52; G06F 11/3006; G06F 11/328; G06F 11/3013; G06F 11/3409; G06F 16/00; H04M 15/80; H04W 4/24; G16Y 20/10; G06Q 20/00
See application file for complete search history.

(56) References Cited

U.S. PATENT DOCUMENTS

| | | | |
|---|---|---|---|
| 6,463,462 B1 * | 10/2002 | Smith | H04L 51/066 |
| | | | 709/206 |
| 6,631,363 B1 | 10/2003 | Brown et al. | |
| 6,775,658 B1 | 8/2004 | Zothner | |
| 9,600,251 B1 | 3/2017 | Srivastava | |
| 10,042,685 B1 | 8/2018 | O'Kennedy et al. | |
| 10,628,244 B1 | 4/2020 | Cseri et al. | |
| 10,877,867 B1 * | 12/2020 | Campbell | G06F 11/328 |
| 11,100,232 B1 * | 8/2021 | Juncker | H04L 63/102 |

(Continued)

*Primary Examiner* — John B Walsh
(74) *Attorney, Agent, or Firm* — David R. Stevens; Stevens Law Group

(57) ABSTRACT

Example notification management systems and methods are described. In one implementation, techniques identify multiple devices communicating using a carrier and identify a trigger associated with at least one of the multiple devices. Based on identifying the trigger, the techniques may apply at least one business rule associated with at least one of the multiple devices. The techniques may further generate at least one notification in response to applying the business rule.

19 Claims, 26 Drawing Sheets

(56) References Cited

U.S. PATENT DOCUMENTS

| | | |
|---|---|---|
| 2002/0120540 A1 | 8/2002 | Kende et al. |
| 2003/0083968 A1 | 5/2003 | Marsh et al. |
| 2004/0068559 A1* | 4/2004 | Shaw .................. G06F 21/316 |
| | | 709/224 |
| 2004/0098459 A1 | 5/2004 | Leukert-Knapp et al. |
| 2005/0031096 A1 | 2/2005 | Postrel |
| 2008/0027577 A1 | 11/2008 | Pepe et al. |
| 2009/0197568 A1 | 8/2009 | Carpenter et al. |
| 2011/0202905 A1 | 8/2011 | Mahajan |
| 2011/0246268 A1 | 10/2011 | Satyavolu et al. |
| 2015/0120849 A1* | 4/2015 | Thies ................. H04W 72/0493 |
| | | 709/206 |
| 2016/0063189 A1* | 3/2016 | Soon-Shiong ........ H04L 9/008 |
| | | 705/3 |
| 2016/0350173 A1* | 12/2016 | Ahad ..................... H04L 67/02 |
| 2017/0154347 A1 | 6/2017 | Bateman |
| 2017/0372588 A1 | 12/2017 | Becker Antley et al. |
| 2019/0104382 A1* | 4/2019 | Lalka ................... H04W 4/023 |
| 2019/0334733 A1* | 10/2019 | Jaiswal ................. H04L 51/20 |
| 2020/0128047 A1* | 4/2020 | Biswas ................. H04L 67/10 |
| 2021/0174140 A1* | 6/2021 | DeLuca ............... G06K 9/6256 |
| 2021/0360408 A1* | 11/2021 | Shaw ................... H04W 24/08 |

\* cited by examiner

1150 a. Abstracts away from technicalities of raw Carrier APIs and offers complete, end-to-end business processes as Simetric APIs. Minimizes the amount of information collected from the user by leveraging information stored in Simetric datastores.
b. In case of chained APIs, where one or more Carrier APIs must be executed before the real Data Retrieval or Action APIs can be executed, orchestrates this chain transparently behind the scenes without burdening the user.
c. All Simetric APIs are RESTful, even if Carrier's APIs are not
d. Users can submit business process requests in-bulk, even if the Carrier does not support bulk requests. The Simetric Bulk API engine then breaks the bulk requests either into individual request or smaller batches that the Carrier supports.
e. A dynamic API Request Composition engine takes the user provided information, augments it with necessary information stored in Simetric datastores and then leverages a Semantic Translation layer to compose APIs as the Carrier expects it. Then, it submits the request to an Orchestration Engine in Azure Service Fabric (ASF).
f. The ASF Orchestration Engine intelligently spawns one or more parallel threads to execute the APIs. It matches the number of parallel threads to the batch-sizes and parallelization supported by the specific Carrier, internal load-balancers as well as historical information about the performance of Carrier APIs.
g. From the time a user submits the request, the entire operation is ASYNC
h. As far as Carrier APIs are concerned, the engine supports both SYNC and ASYNC responses. In case of ASYNC responses, it keeps track of all submitted requests, and keeps pinging the Carrier until the final response is received
i. The user is notified in a variety of modes about the status/ completion of their request:
    i. A console within the Simetric Portal
    ii. In-App/ Email/ Text alerts
    iii. Post-back to a notification queue set up by the Customer
    iv. Callback initiated by the Customer
j. Finally, after completion of request(s), the bulk engine updates Simetric datastores and refreshes all impacted reports. This ensures that the Simetric databases are almost immediately in the sync with the remote System of Record (SOR) i.e. the Carrier databases

Simetric API Catalog is a suite of Business Process APIs including inquiries (GETS), connectivity and lifecycle management and native Simetric Device Profile Enrichment (POST/ PUTS).

Inquiries implement a canonical data model that is agnostic of carrier – a.k.a. Single Pane of Glass for reporting & analytics.

Management APIs abstract and synthesize 100's of Carrier APIs into just a handful of well-defined, well-rounded Business Processes.

Enrichment APIs afford customers to add tags and additional information at an individual Device level to better segment & manage their business. These is an exclusive Simetric ® capability not provided by any Carrier platform.

Finally, the API Catalog implements open API standards, instrumentation, telemetry and orchestration:
1. REST wrapper
2. Open API 2.0 standard
3. Azure API Management for network load balancing, authentication, managing SLAs and monitoring performance
4. Swagger to automatically generate code snippets for integration – C#, PHP and several other scripting languages
5. Postman Integration
6. At the DB level, implements contextual, role and row-level secondary authentication and authorization – which is also a Simetric® specialized IP
7. All Simetric APIs offer atomic and bulk calls. By leveraging Bulk API engine, Simetric® offers multiplied efficiencies and many more ways to notify a user
8. Automatic multi-threaded parallel execution – again a Simetric® specialty

FIG. 13A

NOTIFICATION MANAGEMENT SYSTEMS AND METHODS

RELATED APPLICATIONS

This application claims the priority benefit of U.S. Provisional Application Ser. No. 63/068,334, filed on Aug. 20, 2020, the disclosure of which is hereby incorporated by reference herein in its entirety.

TECHNICAL FIELD

The present disclosure relates to management of devices and associated data, such as IoT (Internet of Things) devices.

BACKGROUND

In many situations, a business may not be able to leverage a single cellular carrier in their deployments of IoT smart devices. For example, business IoT deployments can span multiple territories for which different cellular carriers are present or conversely a single IoT deployment (e.g., a connected car) can traverse multiple cellular carrier networks. Moreover, cellular-carrier management systems and IoT management platforms vary greatly. As a result, the business's IoT deployments may consist of fragmented financial and operational data from multiple cellular-carriers and IoT management platforms creating complexities for the business in assessing its IoT deployments. The need exists for systems and methods that can overcome these problems.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 11B illustrates an example embodiment of various features of a bulk API engine.

FIG. 13A illustrates an example embodiment of various features of an API catalog.

DETAILED DESCRIPTION

Figure 1:
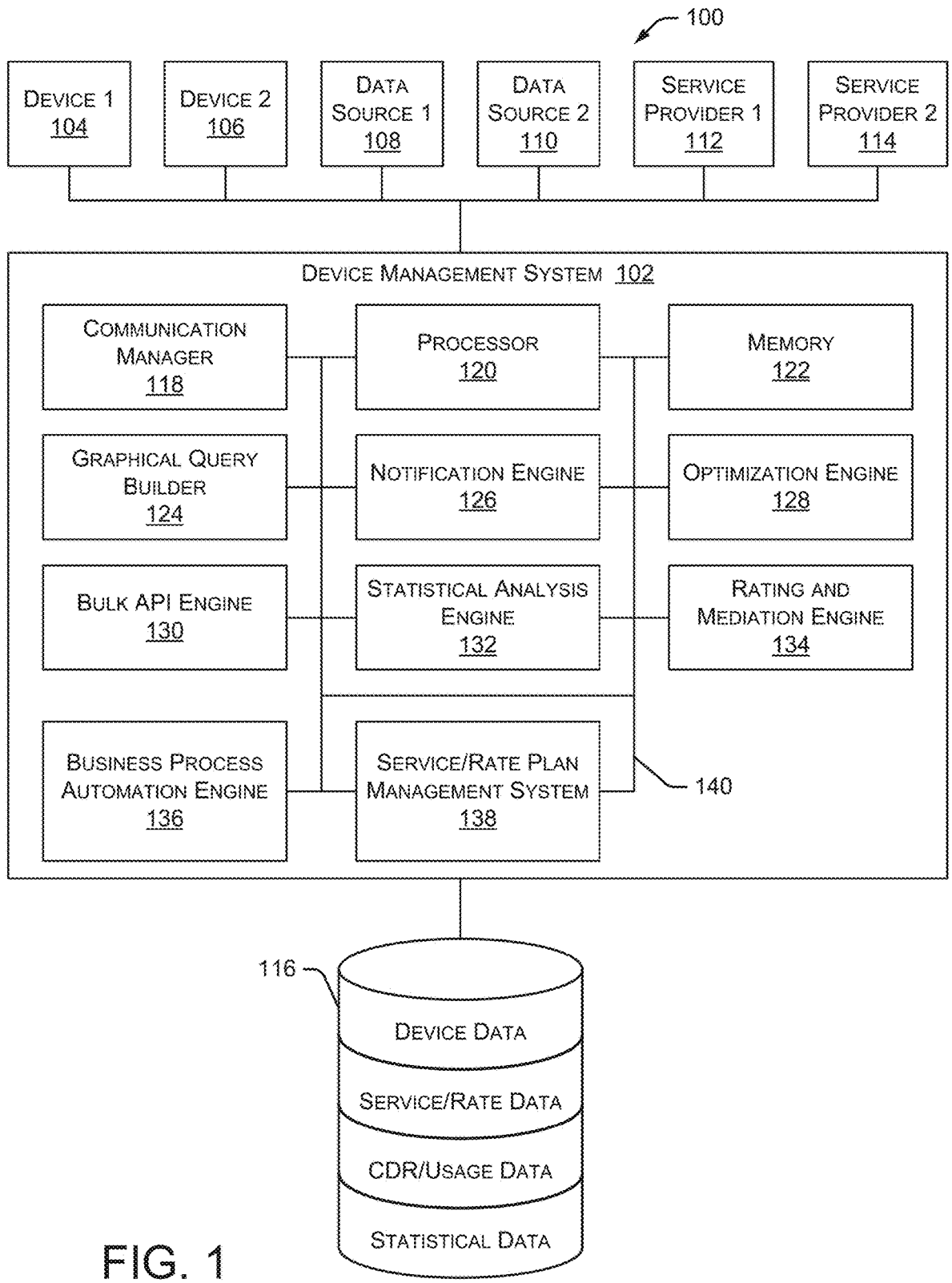
FIG. 1 is a block diagram illustrating an environment within which an example embodiment may be implemented.

In some embodiments, the systems and methods discussed herein perform various information management tasks associated with multiple devices. In particular embodiments, these systems and methods are associated with information management of cellular connectivity data associated with IoT (Internet of Things) devices deployed in any number of geographic areas.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer usable medium. Such software, when executed in one or more data processing devices, causes a device to operate as described herein.

In some embodiments, the systems and methods described herein provide information management of data for business IoT deployments (such as enterprise businesses) and may receive inventory of deployed assets, such as IoT devices. The managed data may include information associated with a subscriber identity module ("SIM") from the business and requested connectivity data, such as usage and rating data (e.g., pricing plans) associated with the SIM from one or more cellular carriers. The described systems and methods may also receive data associated with the SIM from the cellular carrier(s), normalize and aggregate cross-cellular carrier data SIMs, usage and rating elements into a singular, uniform business view. Additionally, the systems and methods may provide financial and operational information from the deployed SIMs (e.g., enterprise IoT deployment) to the business through a secure and private, website or web-based application. As used herein, a cellular carrier may be referred to as a carrier, a data carrier, a cellular service provider, a service provider, and the like.

Increasingly, businesses are deploying IoT smart devices, comprising physical, networking and intelligent components. For example, these IoT devices may be used to collect, analyze, send, and receive data to improve business performance through monitoring, controlling, optimization and automation. In some embodiments, the IoT devices are used to redefine industries and branches of industries. For example, with wind turbines, a small microcontroller can control each rotor blade at each revolution in such a way that the maximum wind energy is used. In another example, some autonomous vehicle companies are leveraging sensors and software to scan constantly for objects around the vehicle and continuously read traffic controls, traffic signs, and the like. Coupled with the detailed three-dimensional maps built and delivered to the vehicle via cellular connectivity, deployment of autonomous vehicles is continuing to increase. The systems and methods discussed herein are useful with new and emerging technologies by changing the way businesses interact with customers, other systems, and the like.

The systems and methods described herein help to overcome the problems associated with multi-cellular carrier connectivity in business IoT deployments. The limitations of existing systems can be mitigated or eliminated using the systems and methods discussed herein.

In some situations, conventional information management systems are often focused on organizing, protecting, and recovering the data from fixed computing devices, such as servers or desktop computers. As a result, a person's hosted data and mobile data may be scattered outside of the purview of conventional information management systems and that data will therefore not be backed up or otherwise actively managed. Thus, in the event that a mobile device is lost or broken, or a hosted service has a service disruption, there is a risk that a person's critical data may be lost, without any way to recover it.

The systems and methods described herein can overcome the above problems and provide additional benefits. For example, the systems and methods described herein may receive and analyze various types of data to identify optimal data carrier allocation to multiple devices, such as cellular IoT devices. These systems and methods optimize this allocation by running multiple scenarios simultaneously to determine which devices should be allocated to specific carriers (and specific carrier plans) to optimize the cost of providing services to those devices and optimizing the performance of the devices. Based on specific optimizations and analysis, the described systems and methods generate recommendations to change services associated with one or more devices, which will satisfy the determined optimization.

Additionally, the systems and methods discussed herein describe various embodiments and features of an interactive query builder (also referred to as an "interactive query engine"), a notification engine, a reporting engine, and other components, methods, and the like.

FIG. 1 is a block diagram illustrating an environment 100 within which an example embodiment may be implemented. As shown in FIG. 1, a device management system 102 is coupled to a first device 104, a second device 106, a first data source 108, a second data source 110, a first service provider 112, and a second service provider 114. Devices 102 and 104 may be any type of device, such as an IoT device or other device that communicates via a cellular network or other data communication system. In some embodiments, devices 102, 104 may have an associated device status, such as activated, canceled, deactivated, and unknown. Although two devices 102 and 104 are shown in FIG. 1, particular implementations may include any number of devices 102, 104 coupled to device management system 102.

Data sources 108 and 110 can be any type of data source that provides any type of data to device management system 102 (or receives any type of data from device management system 102). Data sources 108 and 110 may be associated with one or more third party companies or other entities. In some embodiments, data sources 108, 110 may provide data related to manufacturer information, hardware information, network information, operating system information, programmability information, geolocation information, and the like. Although two data sources 108 and 110 are shown in FIG. 1, particular implementations may include any number of data sources 108, 110 coupled to device management system 102.

Service providers 112 and 114 can be any type of service provider that offers services to device management system 102 (or receives any type of service from device management system 102). For example, service provider 112 and/or 114 may be a cellular service provider or an entity providing any other type of service. Although two service providers 112 and 114 are shown in FIG. 1, particular implementations may include any number of service providers 112, 114 coupled to device management system 102.

In some embodiments, device management system 102 is coupled to devices 104, 106, data sources 108, 110, and service providers 112, 114 via any number of data communication networks, cellular communication networks, or other communication networks. The communication between device management system 102 and devices 104, 106, data sources 108, 110, and service providers 112, 114 may use any type of network topology using any communication protocol.

As illustrated in FIG. 1, device management system 102 is also coupled to a database 116, which stores various information associated with device management system 102. For example, database 116 may store data associated with any number of managed devices 104, 106, service/rate data associated with any number of cellular carriers, CDR (Call Detail Record) and usage data, and statistical data. Database 116 may also store any other type of data, such as any data generated or received by device management system 102.

In some embodiments, device management system 102 includes a communication manager 118, a processor 120, and a memory 122. Communication manager 118 allows device management system 102 to communicate with other systems, such as devices 104, 106 and data sources 108, 110 shown in FIG. 1, and the like. Processor 120 executes various instructions to perform the functionality provided by device management system 102, as discussed herein. Memory 122 stores these instructions as well as other data used by processor 120 and other modules and components contained in device management system 102.

Additionally, device management system 102 includes a graphical query builder 124, a notification engine 126, and an optimization engine 128. Graphical query builder 124 may allow a system or user (e.g., a system administrator) to build queries that can define at least a portion of the operation of device management system 102. In some embodiments, graphical query builder 124 expands on an interactive query builder discussed herein. For example, the interactive query builder includes a GUI (graphical user interface) that allows the user to interact with one or more underlying data catalogs. This GUI allows a user to select from a set of information and apply a criteria against each, as shown in FIG. 24. The alternate embodiment of graphical query builder 124 allows a user to visually locate devices of interest through the use of interactive widgets and charts/graphs, as shown in FIG. 25.

Notification engine 126 can provide various alerts, reports, messages, and other notifications to one or more systems or users. These notifications may be based on rules, business processes, and other techniques, as described herein. Optimization engine 128 may analyze multiple devices (e.g., devices 104, 106), usage data, rate plans, and the like to optimize the data plan, carrier, and other aspects of the multiple devices to optimize (e.g., minimize) the cellular service costs associated with the multiple devices or optimize other factors associated with the multiple devices. Example alerts include high usage alerts, new activation alerts, no usage alerts, usage alerts by device, usage over a threshold value, and the like. Example rules may include company information, notification types, thresholds, and the like.

Device management system 102 further includes a bulk API (application programming interface) engine 130, a statistical analysis engine 132, and a rating and mediation engine 134. Bulk API engine 130 can process multiple API requests related to IoT devices by separating the multiple API requests into groups and processing those groups of API requests, as discussed herein. Bulk API engine 130 may also manage various API requests, including re-submitting API requests that initially fail to be successfully implemented.

Statistical analysis engine 132 performs various statistical operations on data received by and managed by device management system 102. In some embodiments, statistical analysis engine 132 may use device profile information and usage data when performing statistical operations. In some embodiments, statistical analysis engine 132 may store data in database 116 and retrieve data from database 116. For example, statistical analysis engine 132 may combine and correlate multiple datasets, such as device profiles, user-created tags, third party device information, usage information, and the like. Statistical analysis engine 132 may also run multiple analyses and mines the results of the analysis for presentation in a format that is easily consumed by a user. In some embodiments, the results generated by statistical analysis engine 132 may be added to data catalogs used by the interactive query builder, discussed herein. Example analysis that may be performed by statistical analysis engine 132 include various usage patterns, such as standard deviation and variance, averages, lifetime, trailing 12 months, and monthly aggregates.

Rating and mediation engine 134 may calculate connectivity, device management, and other service fees due by customers of third party customers and partners of the provider of device management system 102. Rating and mediation engine 134 may also be used for intra-company cost allocations to different departments or divisions of the company. In some embodiments, there are three types of rating models:

1. Cost Plus Markup—In this model the cost a customer pays to its carrier is distributed over each IoT device, then a markup is added to calculate the fee due by the downstream customers.

2. Single Price List—In this model, the downstream customers are charged based on a price list for the services they use.

3. Multiple Price Lists—In this model, the downstream customers may select more than one price list, then assign one of the multiple price lists to specific devices based on the device's use case.

The mediation aspect of rating and mediation engine 134 provides a capability where specific types of services that are used (and metered) by the downstream customers are identified as chargeable or not chargeable. Rating and mediation engine 134 may also provide one or more integrations, such as:

1. Device assignments to specific downstream customers/departments are sourced from a customer's ERP or order management system.

2. Fee calculations may be available via one or more APIs to be integrated with a billing system or other system.

As shown in FIG. 1, device management system 102 also includes a business process automation engine 136 and a service/rate plan management system 138. Business process automation engine 136 allows a user (e.g., an administrator) or system to define various business rules, business activity triggers, and the like as discussed herein. In particular implementations, business process automation engine 136 may apply (or perform) multiple business rules simultaneously or in the same process serially. This may be referred to as "stacking" business rules. In some embodiments, business process automation engine 136 works in combination with notification engine 126 to provide various notices in response to business rules, business activity triggers, and the like. Service/rate plan management system 138 monitors various services and rate plans offered by any number of different carriers.

The various components (e.g., engines) in device management system 102 may be interconnected by a bus 140 or other communication mechanism. Although a single bus 140 is shown in FIG. 1, other embodiments may include any number of buses 140 that allow specific components to communicate with one another.

In some embodiments, device management system 102 may receive various types of data from any number of carriers. Example types of data include SIM inventory data, device information, usage data, change history, account information, and the like.

In particular embodiments, the systems and methods disclosed herein can support the control of multiple devices simultaneously across any number of carriers, rate plans, and the like. Additionally, the described systems and methods may control and identify data associated with a single device. Thus, these systems provide a wide variety of device analysis and device control from a granular level to handling large groups of devices simultaneously.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
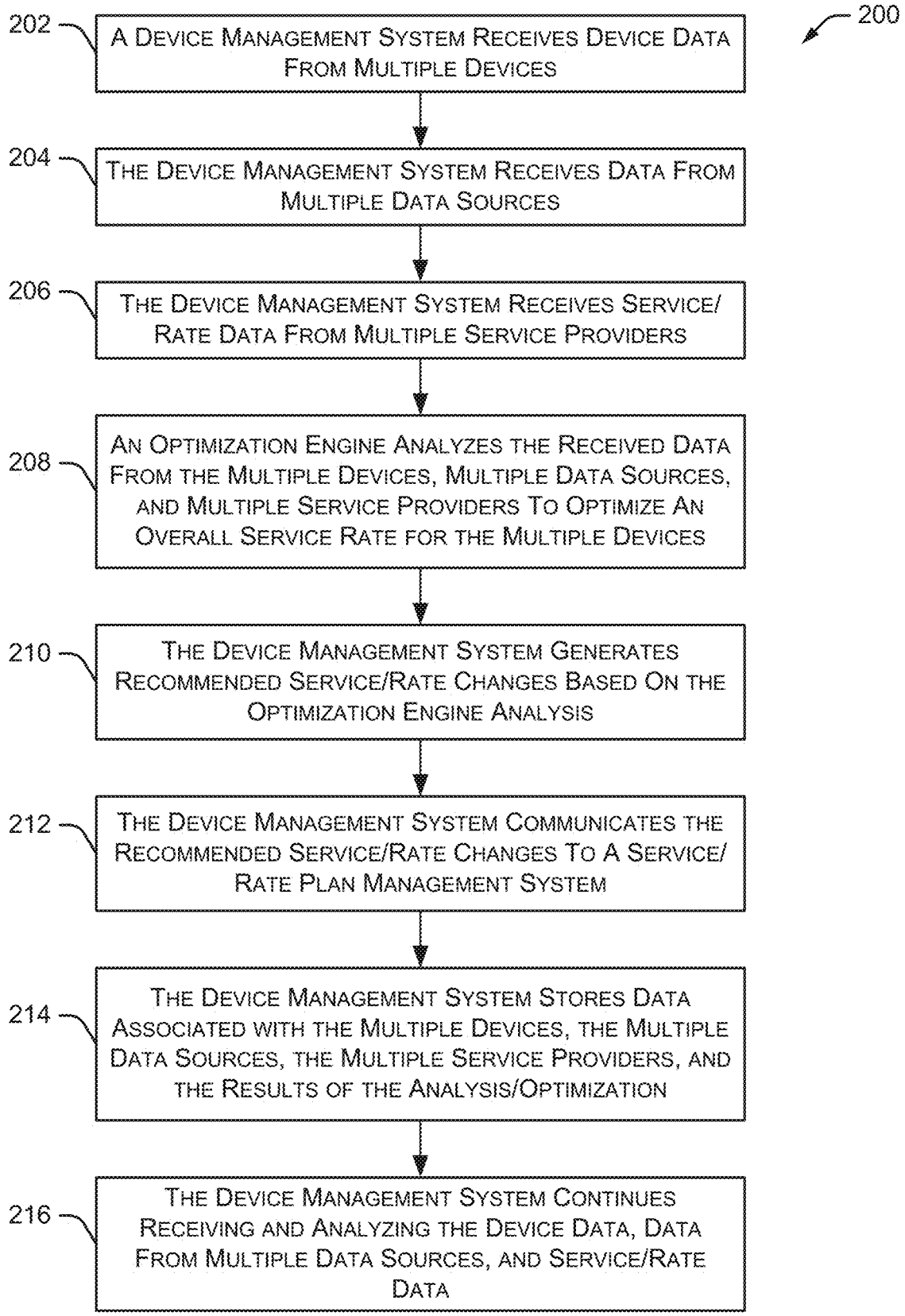
FIG. 2 is a flow diagram illustrating an embodiment of a process for managing devices and associated data.

FIG. 2 is a flow diagram illustrating an embodiment of a process 200 for managing devices and associated data. Initially, a device management system receives 202 device data from multiple devices. The multiple devices may be different types of devices, located in different geographic areas, and serviced by different service providers (e.g., different cellular communication networks). Process 200 continues as the device management system receives 204 data from multiple data sources. The device management system also receives 206 service/rate data from multiple service providers.

Process 200 continues as an optimization engine analyzes 208 the received data from the multiple devices, multiple data sources, and multiple service providers to optimize an overall service rate for the multiple devices. The device management system further generates 210 recommended service/rate changes based on the optimization engine analysis. In some embodiments, the device management system may compare a first rate plan with a second rate plan based on historical usage data of one or more devices as well as other factors and data.

The process continues as the device management system communicates 212 the recommended service/rate changes to a service/rate plan management system. The device management system then stores 214 data associated with the multiple devices, the multiple data sources, the multiple service providers, and the results of the analysis/optimization. Process 200 continues as the device management system continues 216 receiving and analyzing the device data, data from multiple data sources, and service/rate data. In some embodiments, the device management system regularly monitors the received data and continually optimizes the overall service rate based on changes in the received data.

Figure 3:
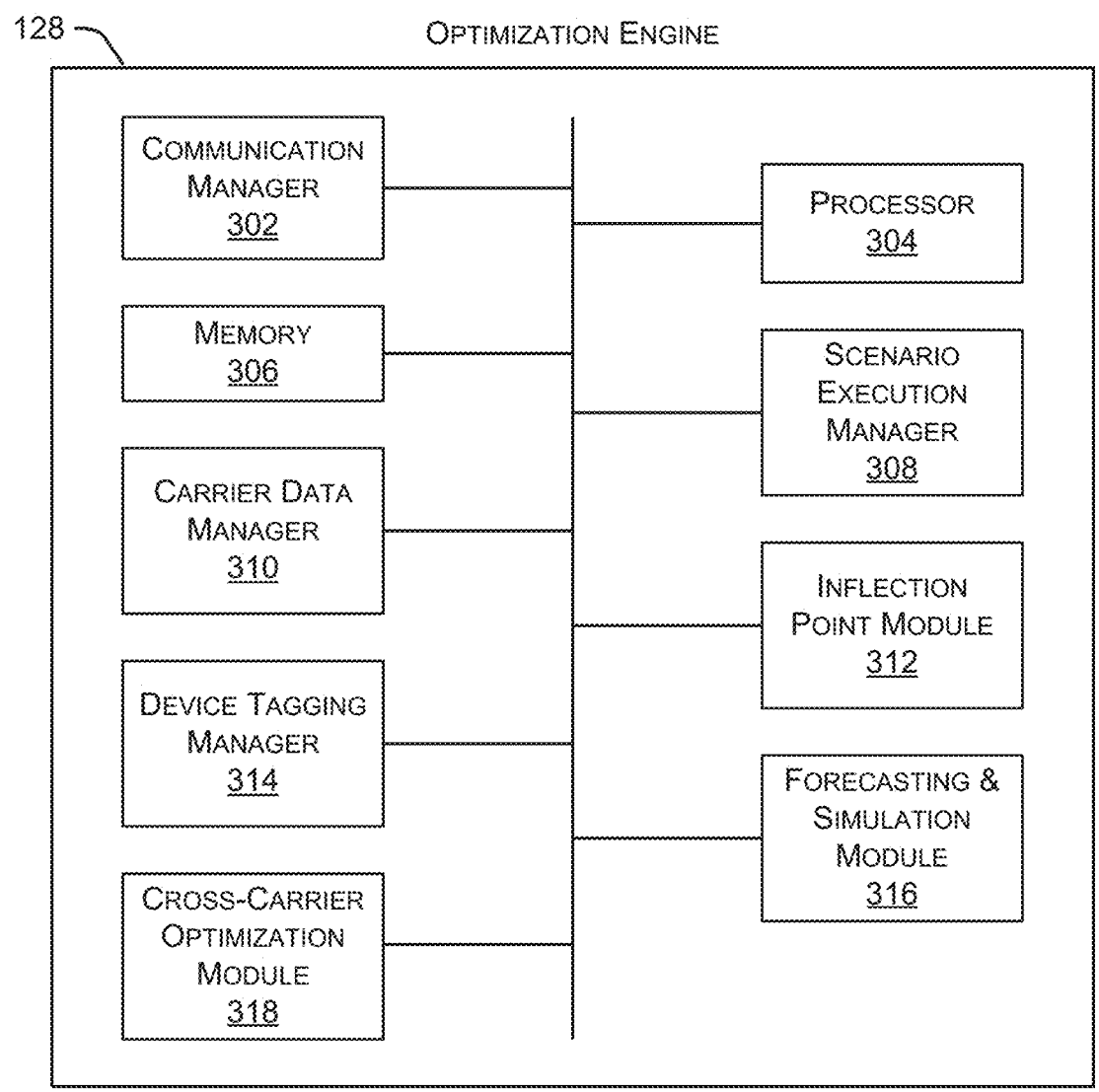
FIG. 3 is a block diagram illustrating an embodiment of an optimization engine.

FIG. 3 is a block diagram illustrating an embodiment of optimization engine 128. As shown in FIG. 3, optimization engine 128 includes a communication manager 302, a processor 304, and a memory 306. Communication manager 302 allows optimization engine 128 to communicate with other systems and components. Processor 304 executes various instructions to perform the functionality provided by optimization engine 128, as discussed herein. Memory 306 stores these instructions as well as other data used by processor 304 and other modules and components contained in optimization engine 128.

Additionally, optimization engine 128 includes a scenario execution manager 308, a carrier data manager 310, and an inflection point module 312. Scenario execution manager 308 performs various scenarios to compare different pricing and service results by, for example, changing service plans for various devices to different carriers. Carrier data manager 310 identifies and maintains current data regarding different carriers, such as different rate plans, geographic areas covered, and the like. Inflection point module 312 may determine an optimal number of devices to move from one rate plan to another. In some embodiments, inflection point module 312 may identify local minima to determine an optimal number of devices to move between rate plans such that the combined cost for the two rate plans is optimized. This embodiment may test multiple approaches to find the optimal number of rate plan moves. In some implementations, inflection point module 312 may include methods that allow a user to test different approaches using a visual editor.

Optimization engine 128 also includes a device tagging manager 314, a forecasting and simulation module 316, and a cross-carrier optimization module 318. Device tagging manager 314 lets a user create "pods" of devices to be defined using any device attribute, such as tags or usage profiles. These pods can have different sets of optimization rules and applied constraints.

Forecasting and simulation module 316 performs both forecasting and simulation functions. With respect to forecasting, optimization is typically performed before the end of a billing cycle, which means devices continue to use data after optimization is complete and rate plans changed. To mitigate against this situation, the systems and methods described herein add "forecasts" to the latest available usage data it had at the time of the last optimization run before the billing cycle ended. These forecasts may be at a device level, pod level, rate plan level, or at an aggregate level, depending on the needs of the customer.

With respect to simulation, forecasting and simulation module 316 may use Monte Carlo simulation to project a number of devices and data usage in one or more future billing periods. A rating engine may then be applied to the simulated usage. In some embodiments, forecasting and simulation module 316 may be used to estimate a cost of scenarios such as OTA (over the air) software updates on the IoT devices deployed in the field and plan for other technology migrations.

Cross-carrier optimization module 318 uses a collected inventory of rate plans offered by various carriers. In some embodiments, an optimization is performed on the rate plans offered by the current carrier, and another optimization is performed on a list of rate plans offered by one or more other carriers.

In other embodiments, optimization engine 128 may use a visual editor that allows a user, for example, to define rules and functions via a GUI that define the optimization process (also referred to as optimization algorithm). The user may create larger optimization processes by building multiple smaller individual rules and functions into the larger optimization process. Certain portions of the larger optimization process can be re-used when creating future optimization processes. Additionally, the user can test the behavior and operation of each individual step/function and analyze the results of the individual step/function on the optimization activity before continuing to build the larger optimization process. In some embodiments, this visual editor supports rapid modeling of new optimization scenarios and creating new optimization processes.

Figure 4A:
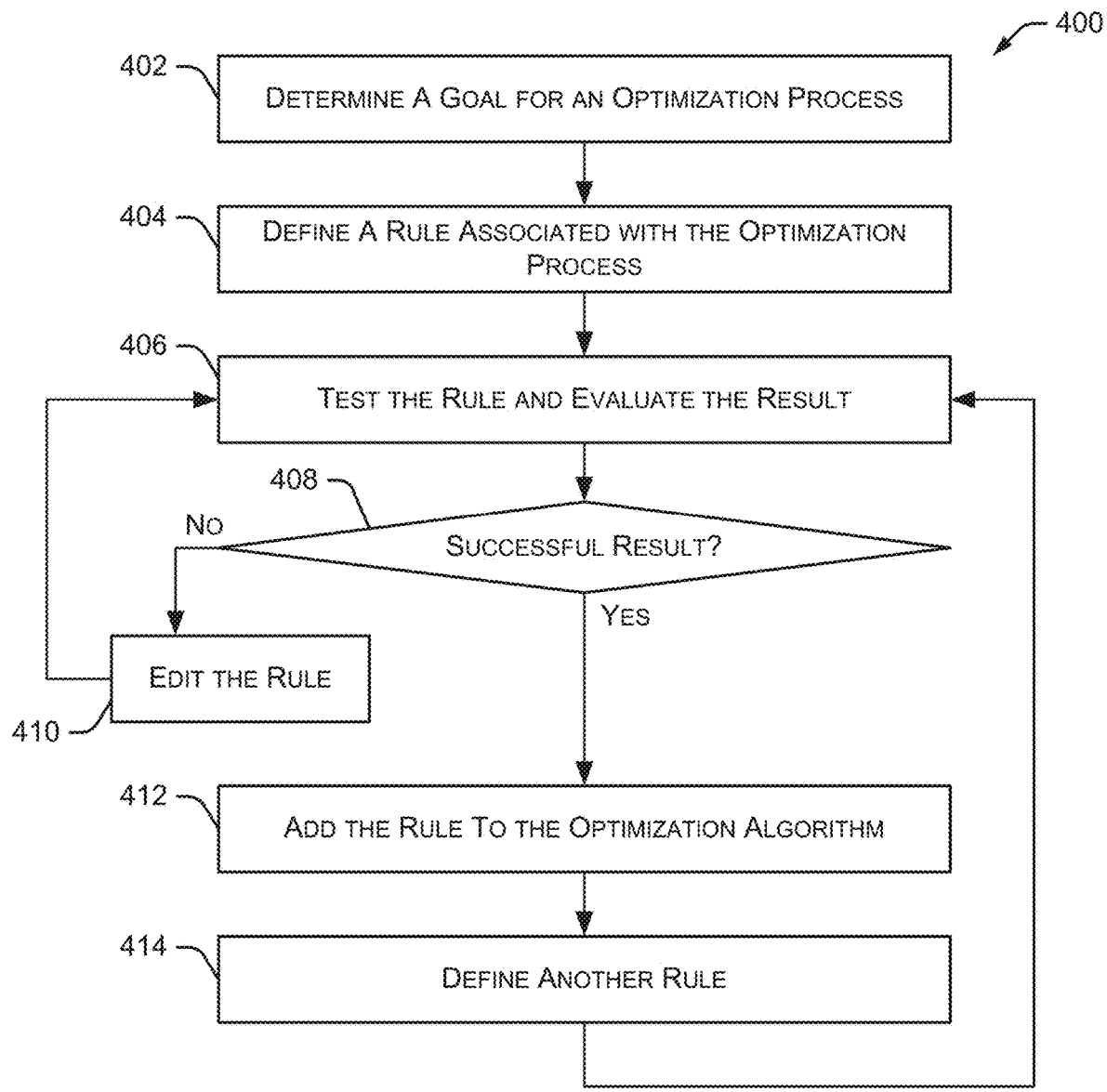
FIG. 4A is a flow diagram illustrating an embodiment of a process for creating, editing, and testing an optimization algorithm.

FIG. 4A is a flow diagram illustrating an embodiment of a process 400 for creating, editing, and testing an optimization algorithm. Initially, the process determines 402 a goal for an optimization process. The process continues by defining 404 a rule associated with the optimization process. A particular optimization algorithm may include any number of rules. In some embodiments, a user or system creating the optimization algorithm may individually select and test rules prior to adding them to the optimization algorithm.

Process 400 continues as the rule defined in 404 is tested 406 and the result of the testing of the rule is evaluated. If the result of the test is not successful at 408, the process continues to edit 410 the rule and re-test the edited rule at 406. If the result of the test is successful at 408, the rule is added 412 to the optimization algorithm. The user or system may then define 414 another rule, then test and evaluate the new rule at 406. The process of 400 continues by adding and testing new rules until the optimization algorithm meets the goal for the optimization process.

Figure 4B:
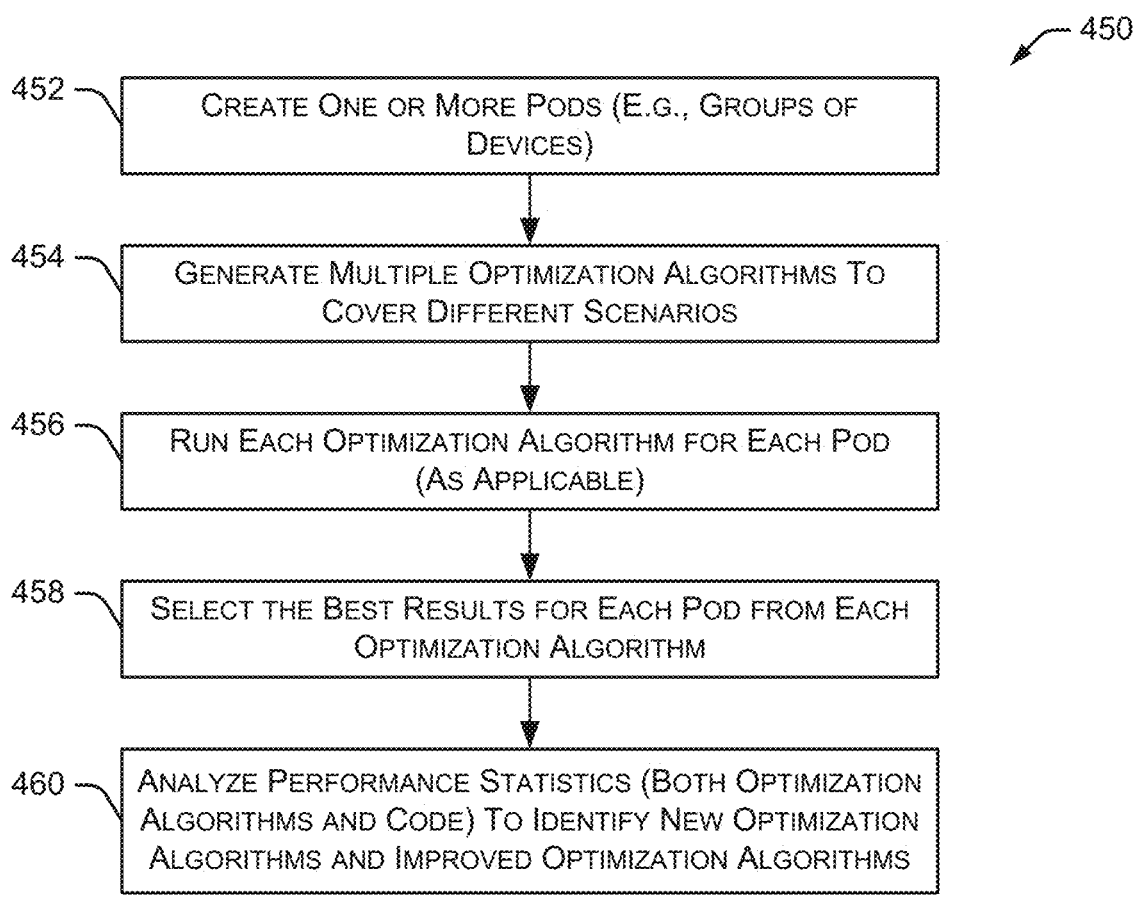
FIG. 4B is a flow diagram illustrating an embodiment of an optimization process.

FIG. 4B is a flow diagram illustrating an embodiment of an optimization process 450. Initially, the process 450 creates 452 one or more pods, such as groups of devices. As mentioned above, pods can be groups of devices defined using any device attribute, such as tags or usage profiles. Process 450 continues by generating 454 multiple optimization algorithms to cover different scenarios. The process then runs 456 each optimization algorithm for each pod, as applicable. Process 450 continues by selecting 458 the best results for each pod from each optimization algorithm. In some embodiments, the process may analyze 460 performance statistics (e.g., optimization algorithms and code) to identify new optimization algorithms and improved optimization algorithms.

In some embodiments, an optimization ensemble (or model) represents a collection of mutually-exclusive optimization algorithms that are each capable of predicting a best assignment of rate plans to devices. The optimization ensemble may also include a generalized orchestration module that can run various steps, handle error scenarios, analyze performance statistics, and create a plan change manifest, which is used by the bulk API engine (discussed herein) to implement the rate plan changes with the appropriate carriers.

In some embodiments, a visual editor may be used to edit or add new rules, edit or add new optimization algorithms, edit or add new ensembles, and edit or add new pods for performing the various functions discussed herein. In particular implementations, a rule-based architecture may support the decomposition of code into small functions, which may be referred to as rules. The described systems and methods may provide version control for any number of rules. In some embodiments, the systems and methods may include various testing, debugging, state-management, and other tools for developing and testing rules, optimization algorithms, and the like. In particular implementations, the systems and methods may perform various logging and tuning functions. A user may create any number of algorithms (e.g., optimization algorithms) and ensembles, test the algorithms and ensembles, and, if the test is successful, deploy one or more algorithms and/or ensembles.

Figure 5:
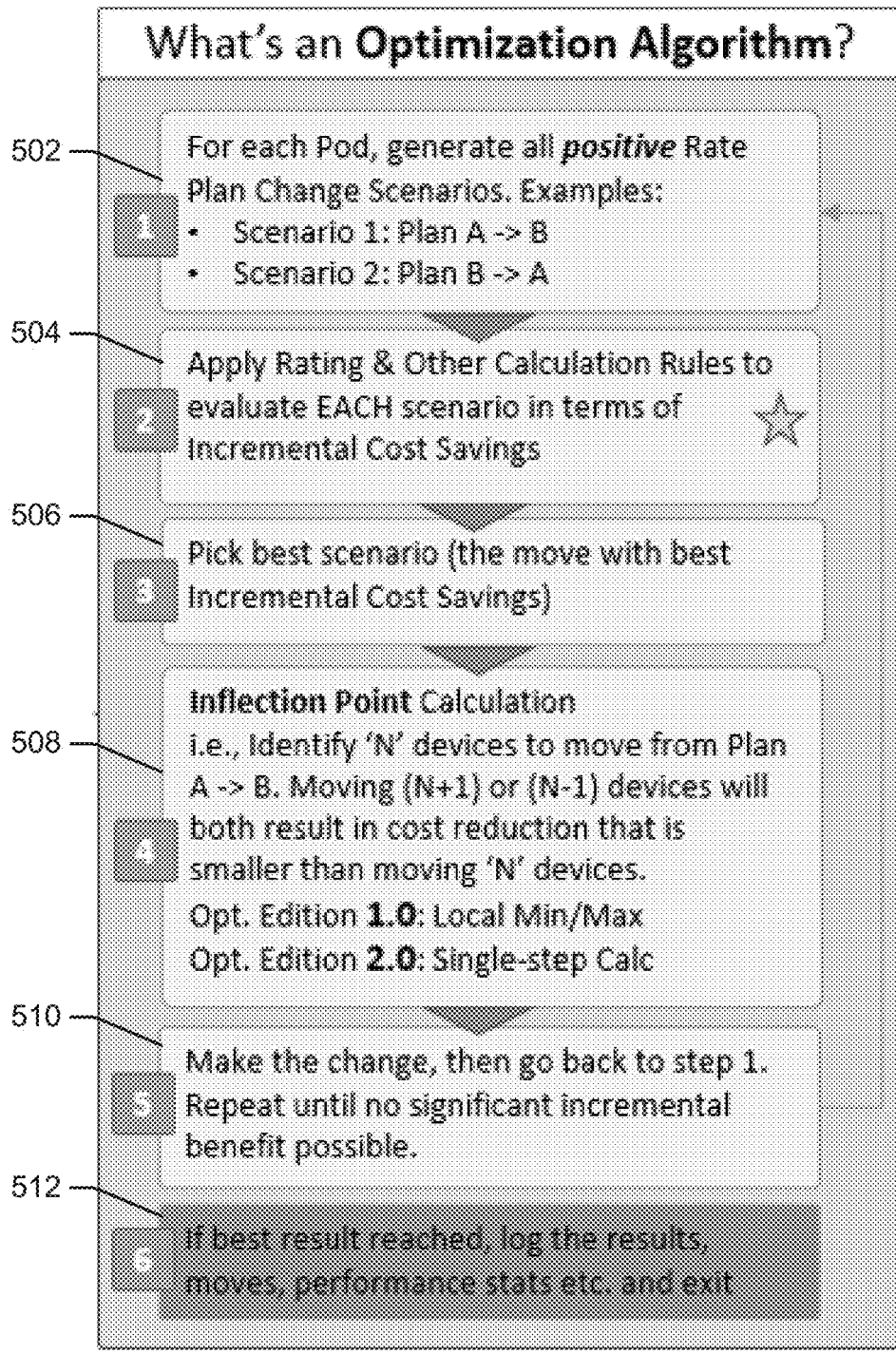
FIG. 5 is a flow diagram illustrating an embodiment of a process for executing an optimization algorithm.

FIG. 5 is a flow diagram illustrating an embodiment of a process 500 for executing an optimization algorithm. Initially, at 502, for each pod, the process generates all positive rate plan change scenarios, such as changing from rate plan A to rate plan B, or changing from rate plan B to rate plan A. In some embodiments, the rate plan change scenarios are each unique (e.g., mutually exclusive) and cover all possible combinations. For example, if there are 10 devices and two available carriers (each carrier having one rate plan), possible combinations include: devices 1-9 at carrier 1 and device 10 at carrier 2, devices 1-8 at carrier 1 and devices 9-10 at carrier 2, devices 1 and 3 at carrier 1 and devices 2 and 4-10 at carrier 2, and so forth. All combinations can be determined and tested to see which particular combination is most cost effective. The process continues at 504 by applying rating and other calculation rules to evaluate each scenario in terms of incremental cost savings. In some embodiments, process 500 follows all device rules, rate plan rules, device constraints, and the like. Process 500 then selects 506 the best scenario (e.g., the change with the best incremental cost savings).

Process 500 continues by performing 508 an inflection point calculation. As shown in FIG. 5, the process may identify N devices to move from rate plan A to rate plan B. For example, in some situations, moving N+1 or N−1 devices may both result in a smaller cost reduction than moving N devices. The process implements 510 the change identified in the previous activities, then returns to 502 and repeats the process until no significant incremental benefit is possible. Finally, when the best result is reached 512, the process may log the results, record the device movements between rate plans, record performance statistics, and the like.

Figure 6:
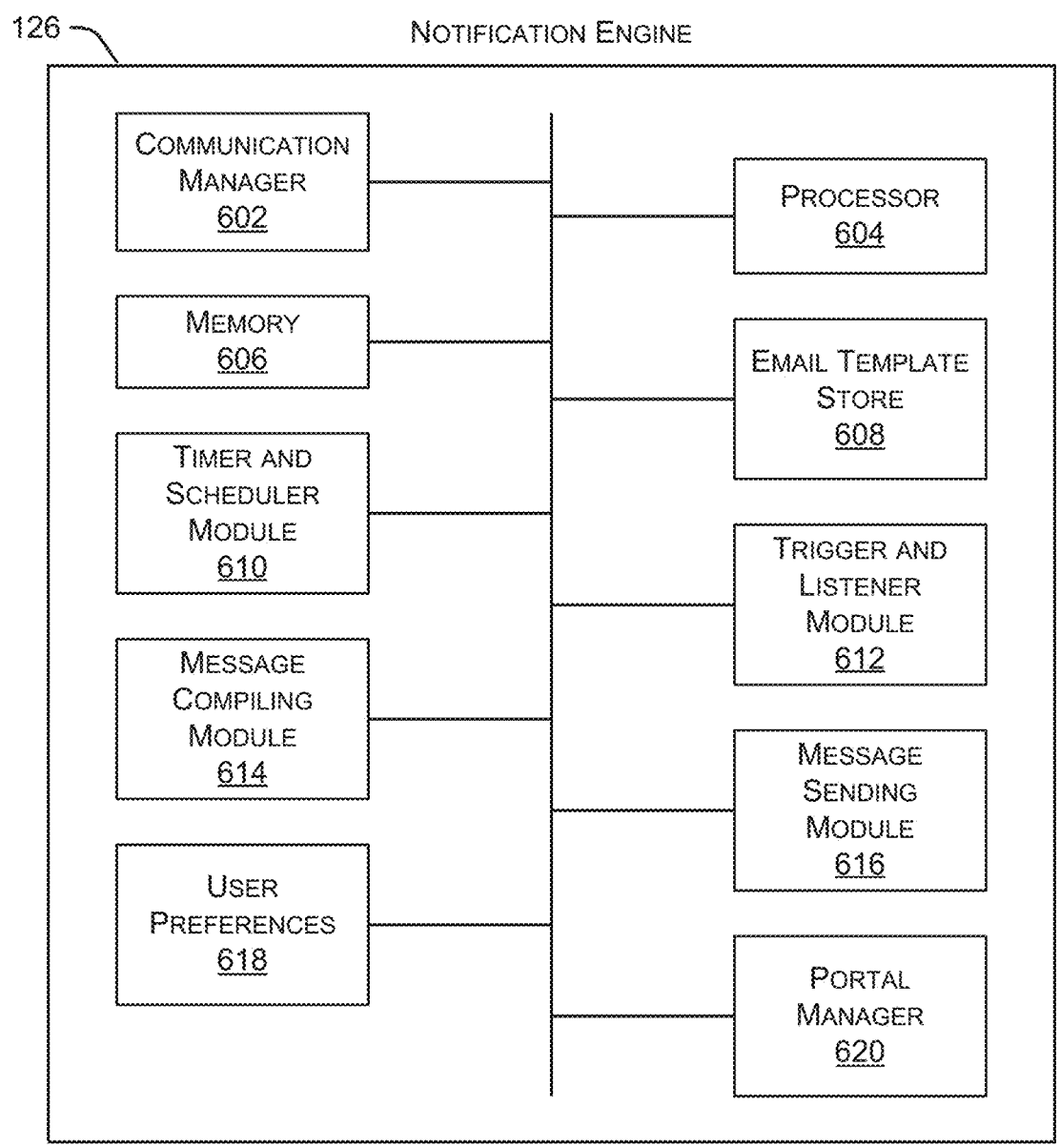
FIG. 6 is a block diagram illustrating an embodiment of a notification engine.

FIG. 6 is a block diagram illustrating an embodiment of notification engine 126. As shown in FIG. 6, notification engine 126 includes a communication manager 602, a processor 604, and a memory 606. Communication manager 602 allows notification engine 126 to communicate with other systems and components. Processor 604 executes various instructions to perform the functionality provided by notification engine 126, as discussed herein. Memory 606 stores these instructions as well as other data used by processor 604 and other modules and components contained in notification engine 126.

Additionally, notification engine 126 includes an email template store 608, a timer and scheduler module 610, and a trigger and listener module 612. Email template store 608 contains any number of email templates for providing various notifications. In some embodiments, the email templates in store 608 can be edited by a user. Timer and scheduler module 610 allows a user to create custom alerts and select a particular schedule for the alerts. In some embodiments, timer and scheduler module 610 may include pre-set timers for certain types of alerts. Trigger and listener module 612 can perform anomaly detection, job failures, and the like. Trigger and listener module 612 may automatically escalate certain issues if necessary. In some embodiments, other systems or methods may automatically detect the escalation of an issue and generate appropriate notifications.

Notification engine 126 further includes a message compiling module 614, a message sending module 616, user preferences 618, and a portal manager 620. Message compiling module 614 may select an appropriate template for a message based on detected topics. Example topics may include an optimization complete notice, a rate plan change complete notice, a billing cycle reminder, a data pipe job failure notice, a data pipe job completion notice, a business process automation (BPA) execution failure notice, a BPA execution completion notice, a bulk API execution failure notice, a bulk API execution completion notice, reporting an available notice, and the like. Example data change topics may include a new rate plan notice, a rate plan change notice, a data quality and completeness check notice, a new user notice, and the like. Message compiling module 614 may also allow a user to define custom alerts based on usage stipulations, status changes, and other criteria, then set a timer for alert notices.

Message sending module 616 can send messages in a variety of formats, such as email, SMS, and the like. User preferences 618 may be set by a user to include, for example, email only, text only, email and text, stop all notices, limit notices to a daily quota, and the like. Portal manager 620 may perform various functions, such as selecting notices of interest, adding a distribution list to each notice type depending on the subject matter, and the like.

In some embodiments, a notification can be triggered by one or more rules, settings, and the like. For example, if a rule is triggered when the usage of a device exceeds a threshold, notification engine 126 may automatically generate a notification of the excessive device usage and communicate the notification in any format to any number of systems, devices, users, and the like.

Figure 7:
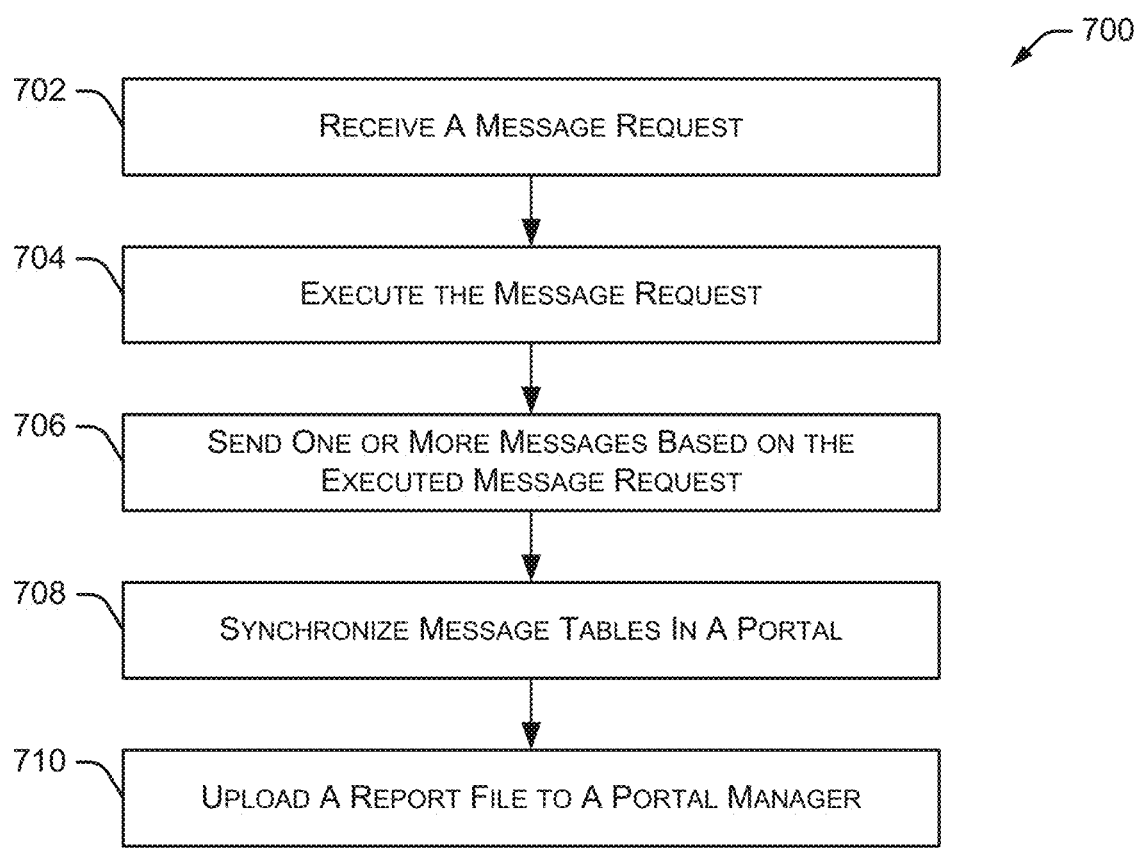
FIG. 7 is a flow diagram illustrating an embodiment of a process for generating and communicating notifications.

FIG. 7 is a flow diagram illustrating an embodiment of a process 700 for generating and communicating notifications. Initially, the process receives 702 a message request. In some implementations, specific processes may run at user-defined schedules to create one or more message requests.

In some embodiments, received requests may be logged or queued in one of the following ways:

1. Timer-based (Async): For topics that are timer-based (e.g., billing cycle reminders), the notification engine itself may initiate the logging of a request.

2. Process-based (Sync): In this situation, an operation (e.g., optimization or rate plan change bulk APIs) itself logs a request upon the successful completion or failure.

The process 700 executes 704 the message request. In some embodiments, a message compiler may compose an email or SMS message using the relevant topical email/SMS template and retrieves the required data to complete the template. In some embodiments, customized queries may be executed to create content, subject line, and recipient lists for messages. Process 700 may also implement message throttles. In some implementations, process 700 may use recipients associated with an alert or a query for a new message. In certain situations, a list of recipients may be determined based on user roles.

The process then sends 706 one or more messages based on the executed message request. In some embodiments, a message sender sends the composed email or SMS message (or both). The process 700 then synchronizes 708 one or more message tables in a portal so that they can be shown in a notification pane or window. In some embodiments, a service may synchronize a notifications database with what's shown in the portal. Finally, the process 700 uploads 710 a report file to a portal manager. Additionally, in some embodiments, a topic may require providing the user with a list if devices that are impacted. In this situation, a notification engine may execute a required query, create an Excel/CSV file and save it in a cloud repository or other data storage system. This information is available to a user via the portal.

In some embodiments, messages and notifications can be received via multiple different carriers. Additionally, messages and notifications can be sent across multiple carriers. Thus, the message tables and portal discussed with respect to FIG. 7 can handle any messages and notifications from multiple carriers, multiple devices (on any carrier), and the like.

Figure 8:
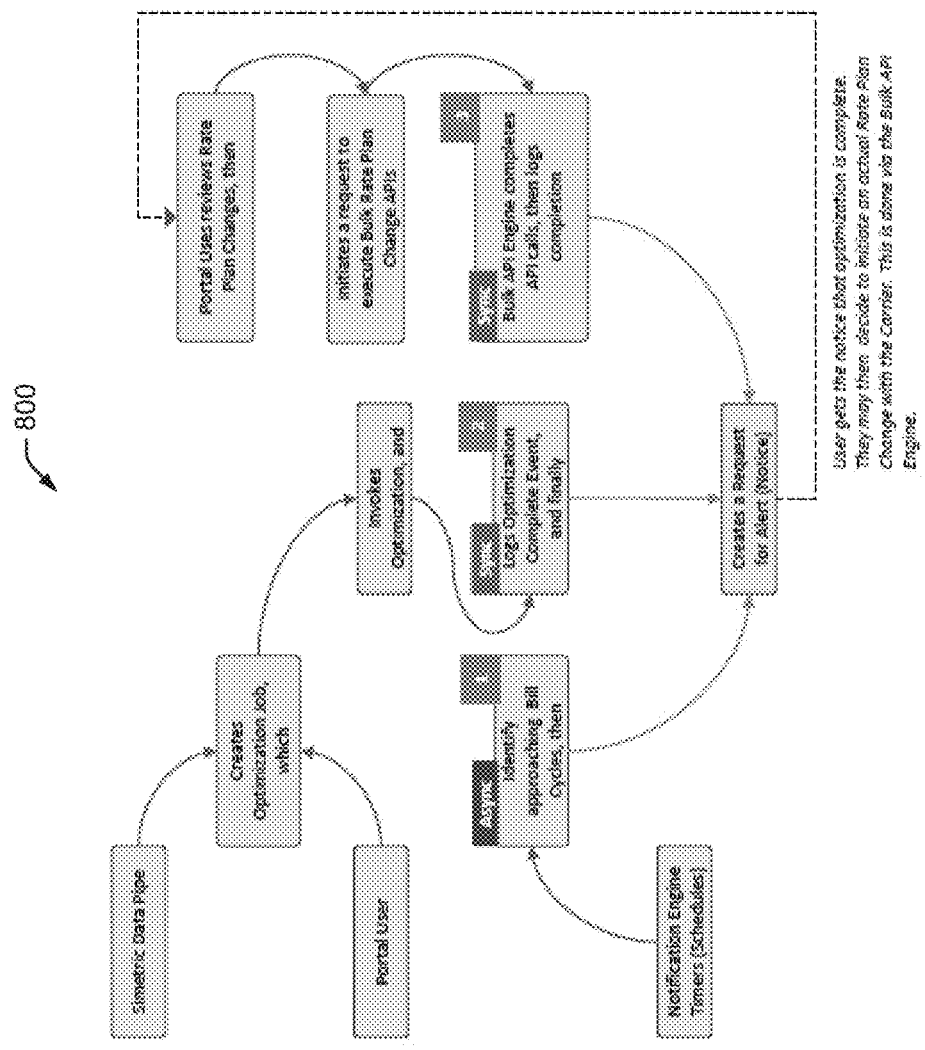
FIG. 8 is a flow diagram illustrating an embodiment of a process for generating various types of notifications.

FIG. 8 is a flow diagram illustrating an embodiment of a process 800 for generating various types of notifications. As shown in FIG. 8, the process 800 may generate at least three different types of optimization alerts: 1) Reminders about approaching bill cycles; 2) Notices regarding a completed optimization; and 3) Notices indicating that a bulk API (e.g., rate plan change) is completed. In other embodiments, any type of optimization alert may be generated and communicated to any number of users or systems.

Figure 9:
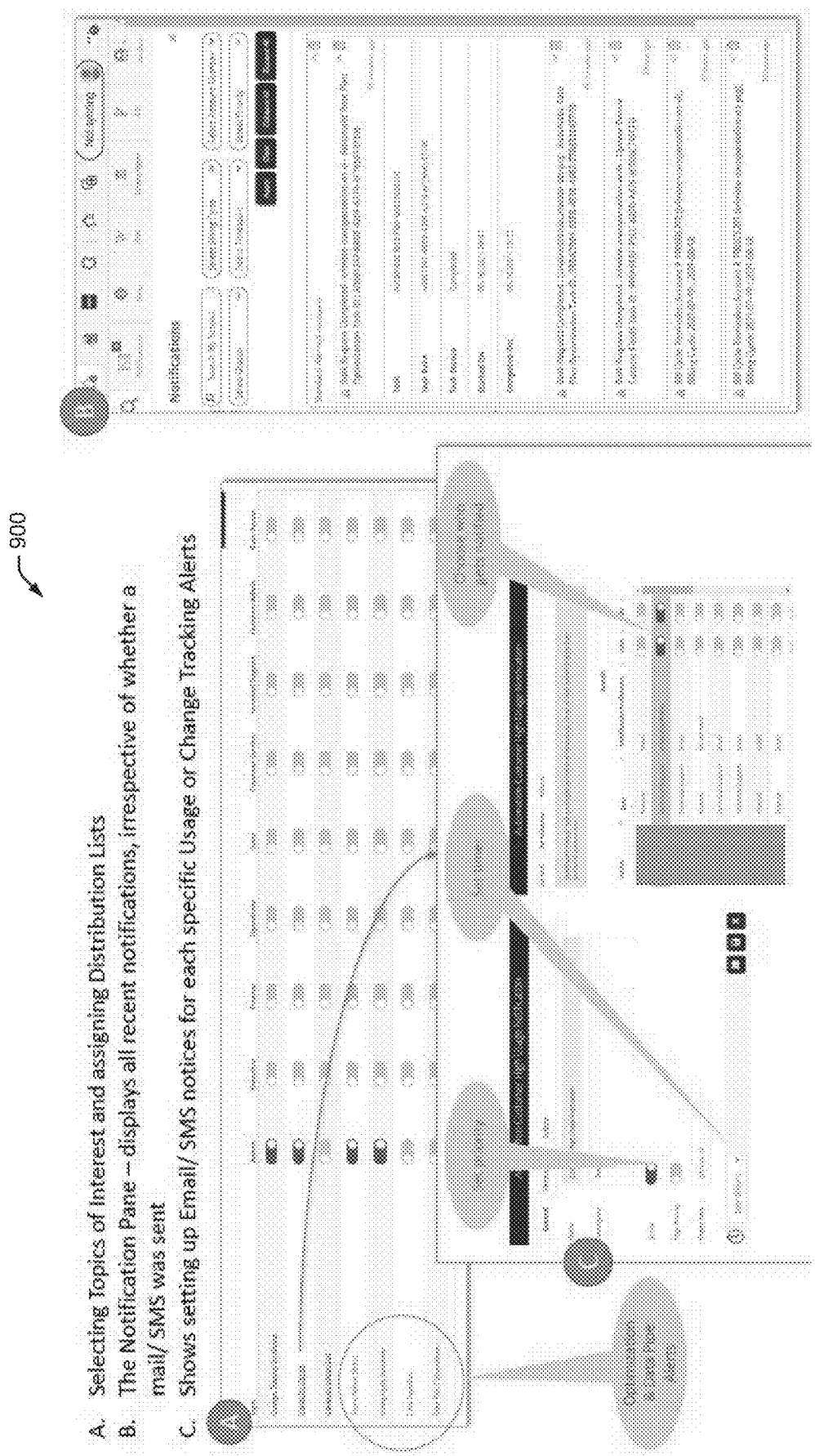
FIG. 9 illustrates an example embodiment of selecting and configuring notification settings.

FIG. 9 illustrates an example embodiment 900 of selecting and configuring notification settings. As shown in FIG. 9, a user of a portal or a system associated with the portal may select topics of interest and assign distribution lists for notifications. A notification pane (e.g., window) may display all recent notifications regardless of whether an email or SMS message was sent. A notification pane may also support setting up email and/or SMS messages for specific alerts, such as usage alerts or change tracking alerts.

Figure 10:
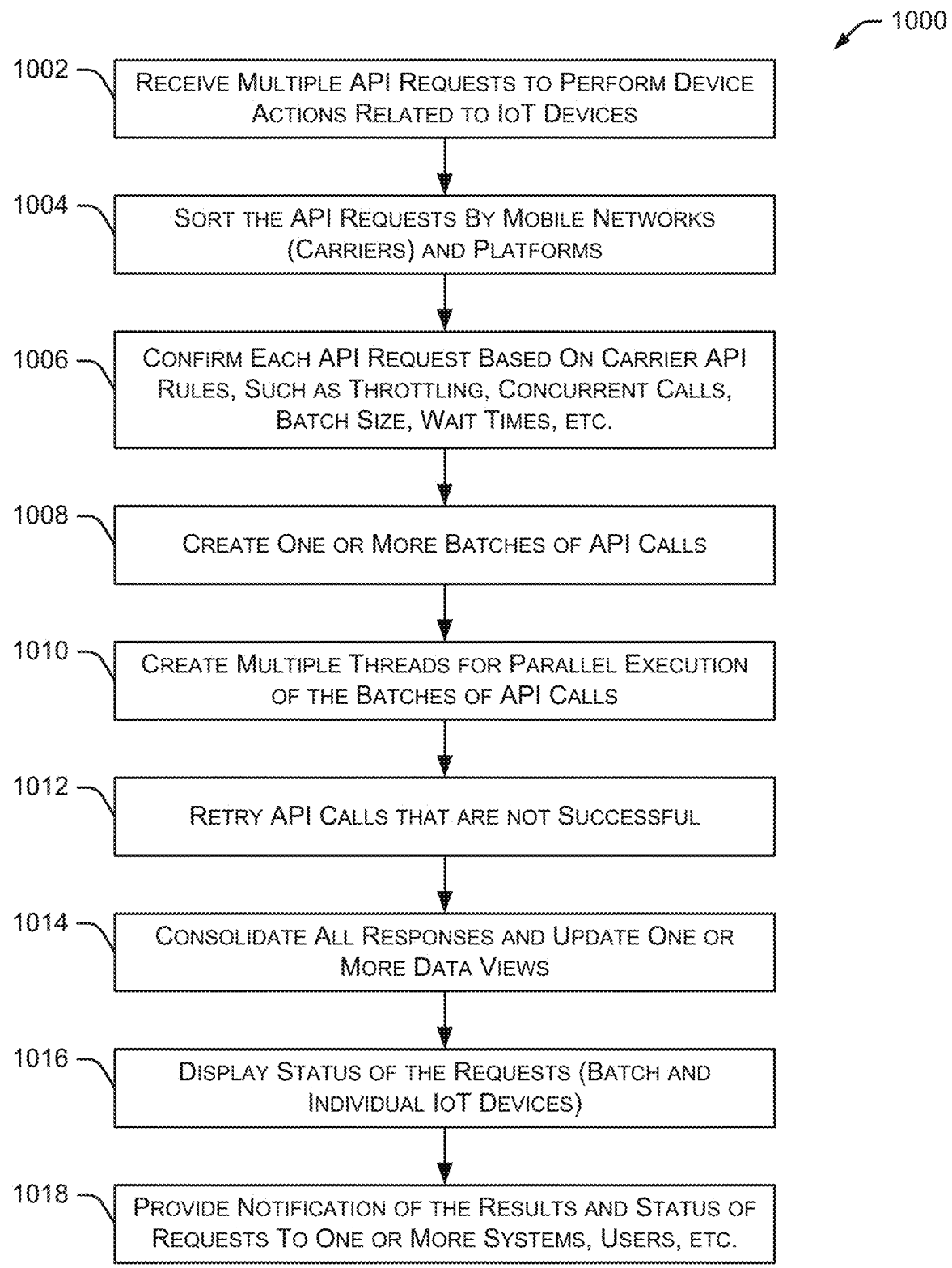
FIG. 10 is a flow diagram illustrating an embodiment of a process for processing multiple API requests related to IoT devices.

FIG. 10 is a flow diagram illustrating an embodiment of a process 1000 for processing multiple API requests related to IoT devices. In some embodiments, process 1000 is implemented, at least in part, by bulk API engine 130. Some of the features and functions performed by bulk API engine 130 include:

Carrier-agnostic in terms of request, response, connection protocols, etc.
Executes multiple parallel threads
Single and bulk requests
Async, fault-tolerant execution
Real-time updates/notification via multiple vehicles
Real-time data sync
Supports multiple integration methods with customer and 3rd party applications
Wraps functionalities as end-to-end actual business processes
Integrates carrier-specific authentication protocols
Converts all APIs to REST, irrespective of carrier implementation Referring to process 1000, initially the process receives 1002 multiple API requests to perform device actions related to IoT devices. Device actions include, for example, changing a device's rate plan, changing a device's service provider, and the like. The process continues by sorting 1004 the API requests by mobile networks (carriers) and platforms. Each API request is confirmed 1006 based on carrier API rules, such as throttling, concurrent calls, batch size, wait times, and the like.

Process 1000 continues by creating 1008 one or more batches of API calls and creating 1010 multiple threads for parallel execution of the batches of API calls. The process retries 1012 (e.g., re-executes) any API calls that were not successful. Process 1000 then consolidates 1014 all responses and updates one or more data views associated with the API calls. The process displays 1016 a status of the requests (e.g., batch and individual IoT devices). Finally, method 1000 provides notification 1018 of the results and status of requests to one or more systems, users, and the like.

Figure 11A:
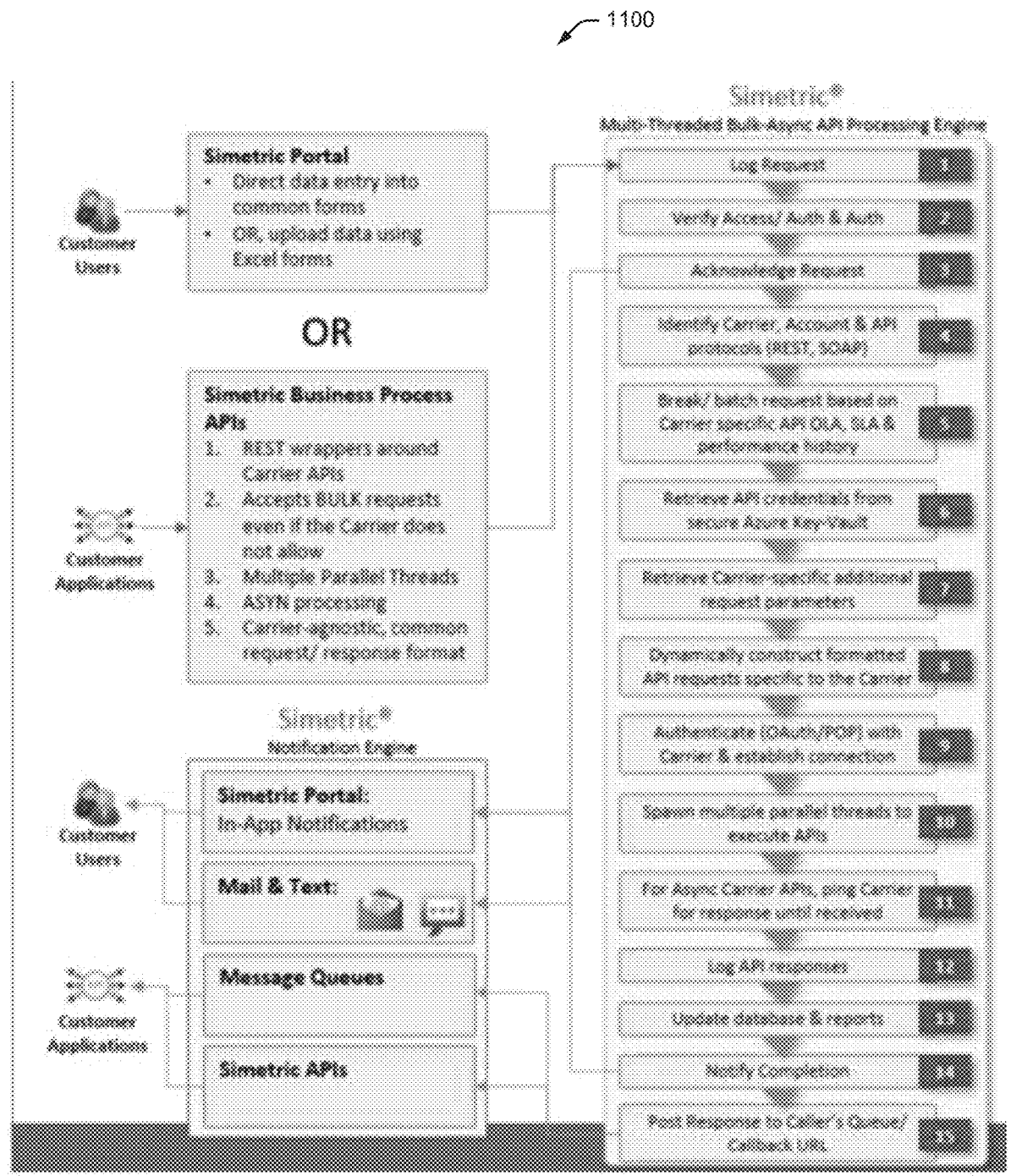
FIG. 11A illustrates an example embodiment of a process for performing bulk API processing.

FIG. 11A illustrates an example embodiment of a process 1100 for performing bulk API processing. In some embodiments, the bulk API processing can be invoked by an API as a Service or invoked by a portal. FIG. 11B illustrates an example embodiment of various features 1150 of a bulk API engine.

Figure 12:
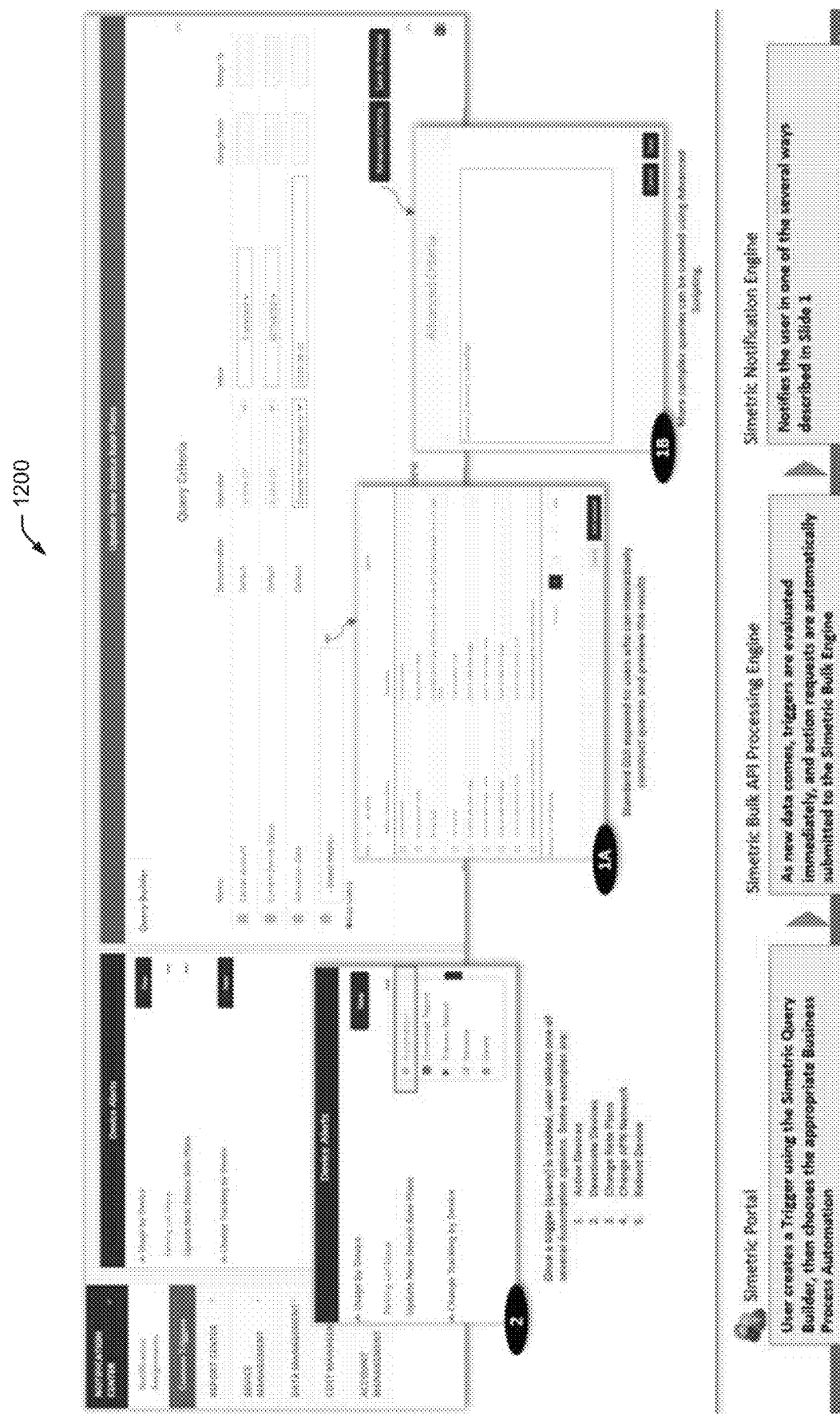
FIG. 12 illustrates an example embodiment of a process for business process automation.

FIG. 12 illustrates an example embodiment of a process 1200 for business process automation. In some implementations, process 1200 may use a bulk API engine and an interactive query engine.

Figure 13B:
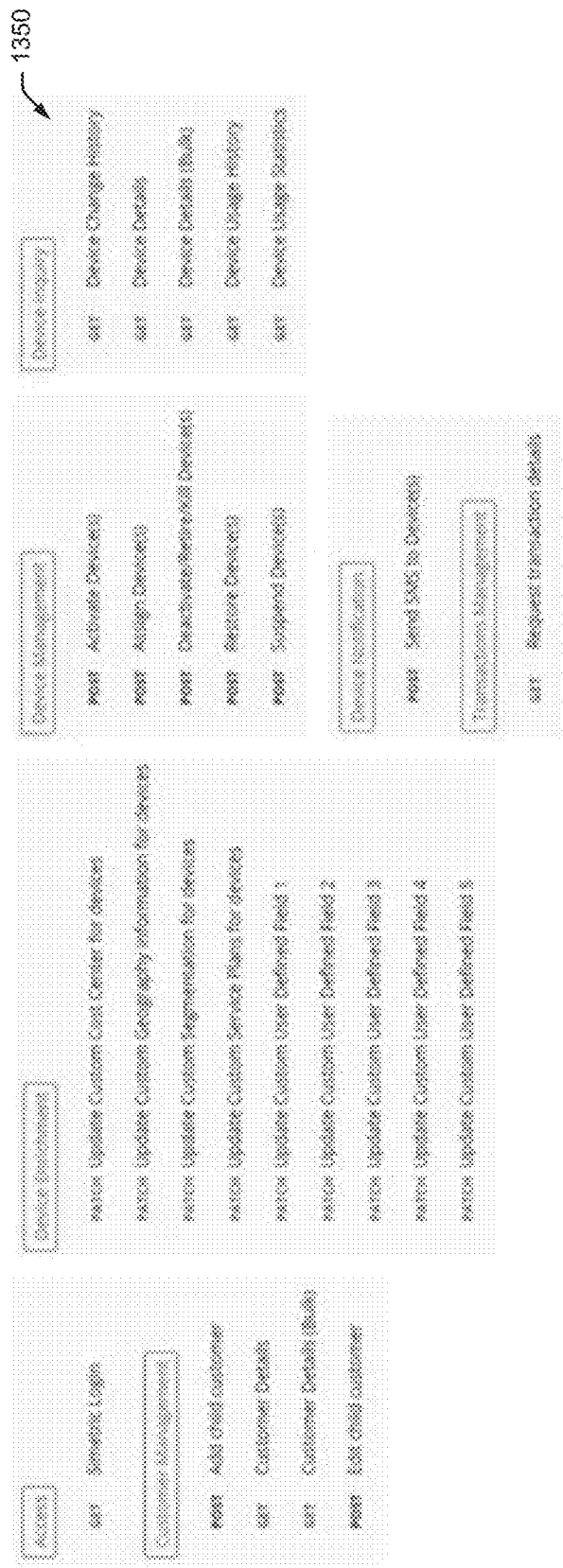
FIG. 13B illustrates an example embodiment of a process for implementing an API as a Service (APIaaS).
Figure 13B:
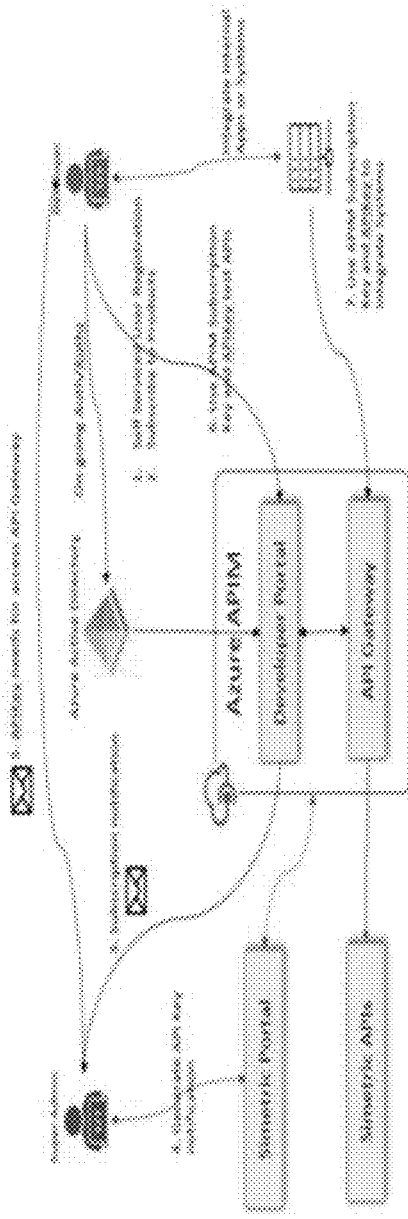

FIG. 13A illustrates an example embodiment of various features 1300 of an API catalog. In some implementations, the API catalog may include multiple business process APIs. FIG. 13B illustrates an example embodiment of a process 1350 for implementing an API as a Service (APIaaS). In some implementations, process 1350 integrates a bulk API engine with an API catalog.

Figure 14:
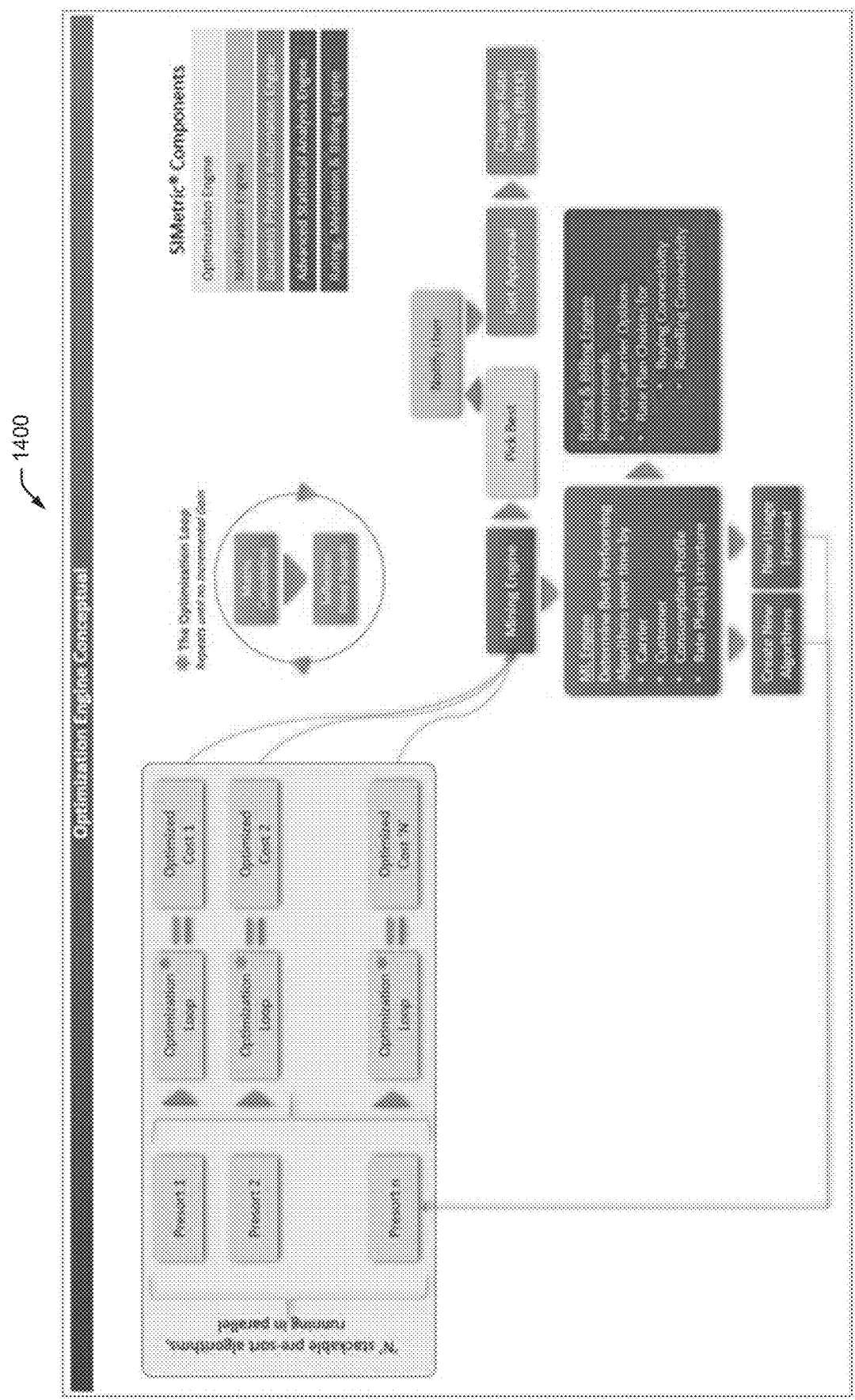
FIG. 14 illustrates an example embodiment of implementing an optimization engine.

FIG. 14 illustrates an example embodiment of implementing 1400 an optimization engine.

Figure 15:
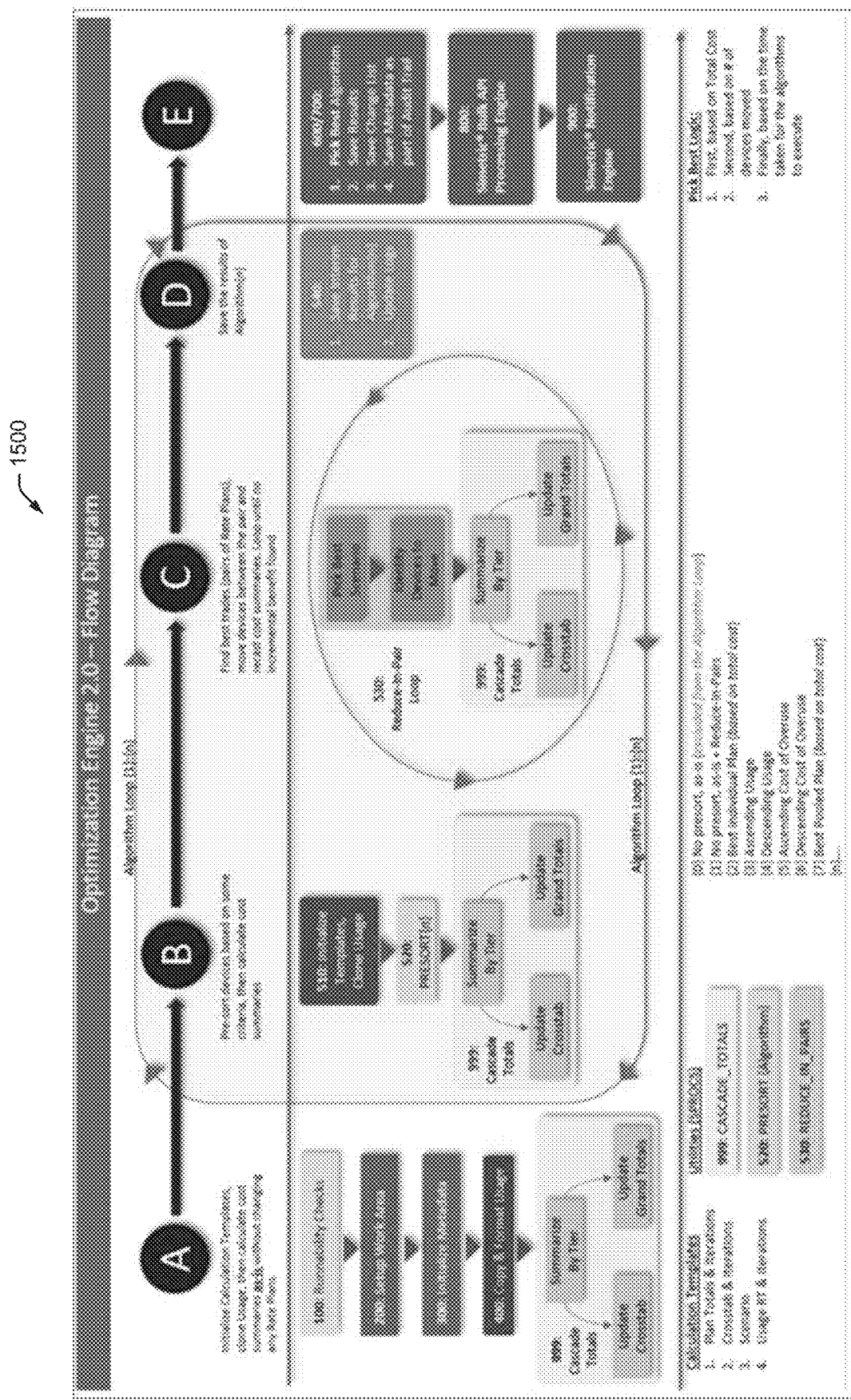
FIG. 15 illustrates another example embodiment of implementing an optimization engine.

FIG. 15 illustrates an example embodiment of a flow diagram 1500 for implementing an optimization engine.

Figure 16:
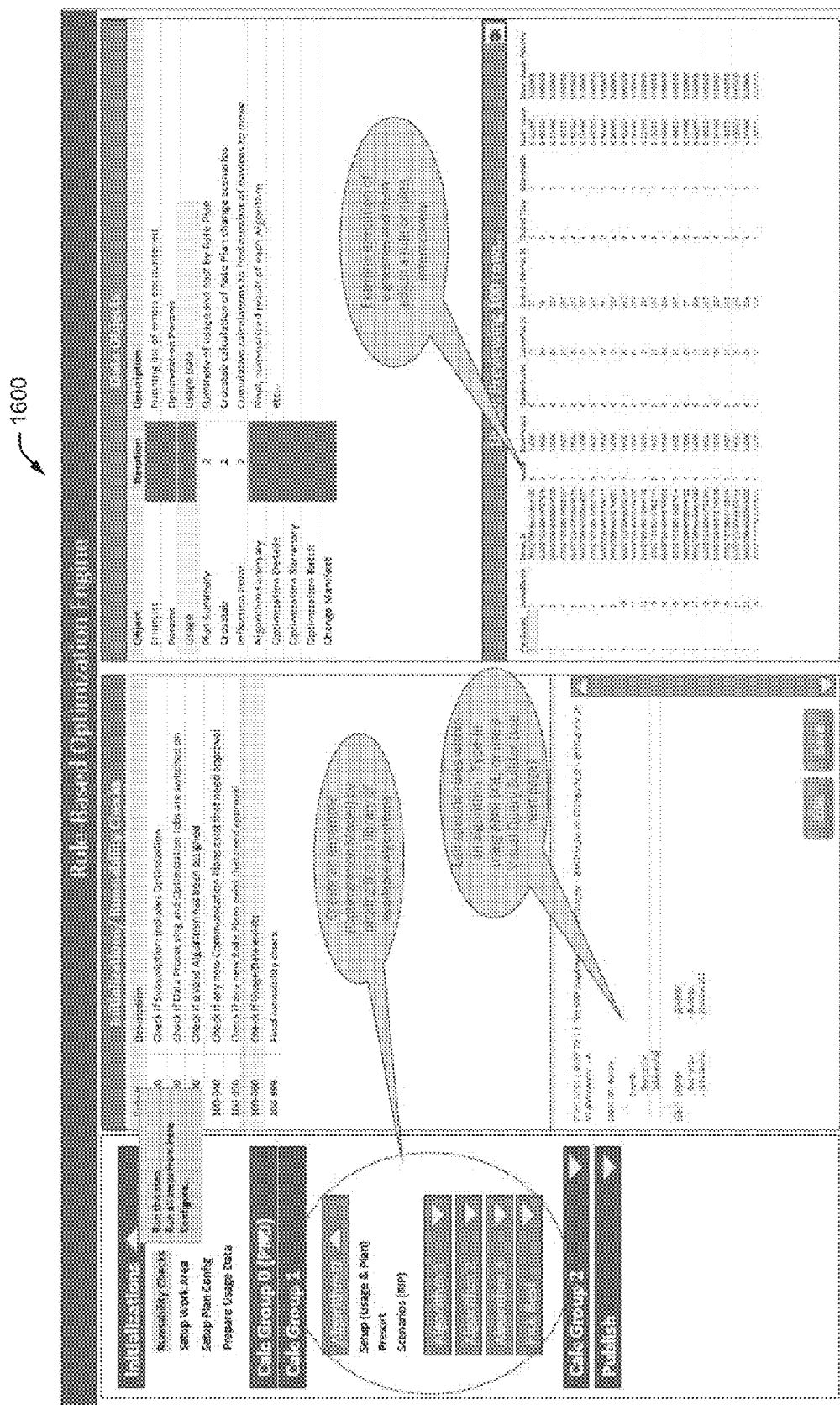
FIG. 16 illustrates an example embodiment of a rule-based optimization engine.

FIG. 16 illustrates an example embodiment 1600 of a rule-based optimization engine showing various initializations, calculation groups, an ensemble of optimization algorithms, specific rules, and results of executing one or more optimization algorithms.

Figure 17:
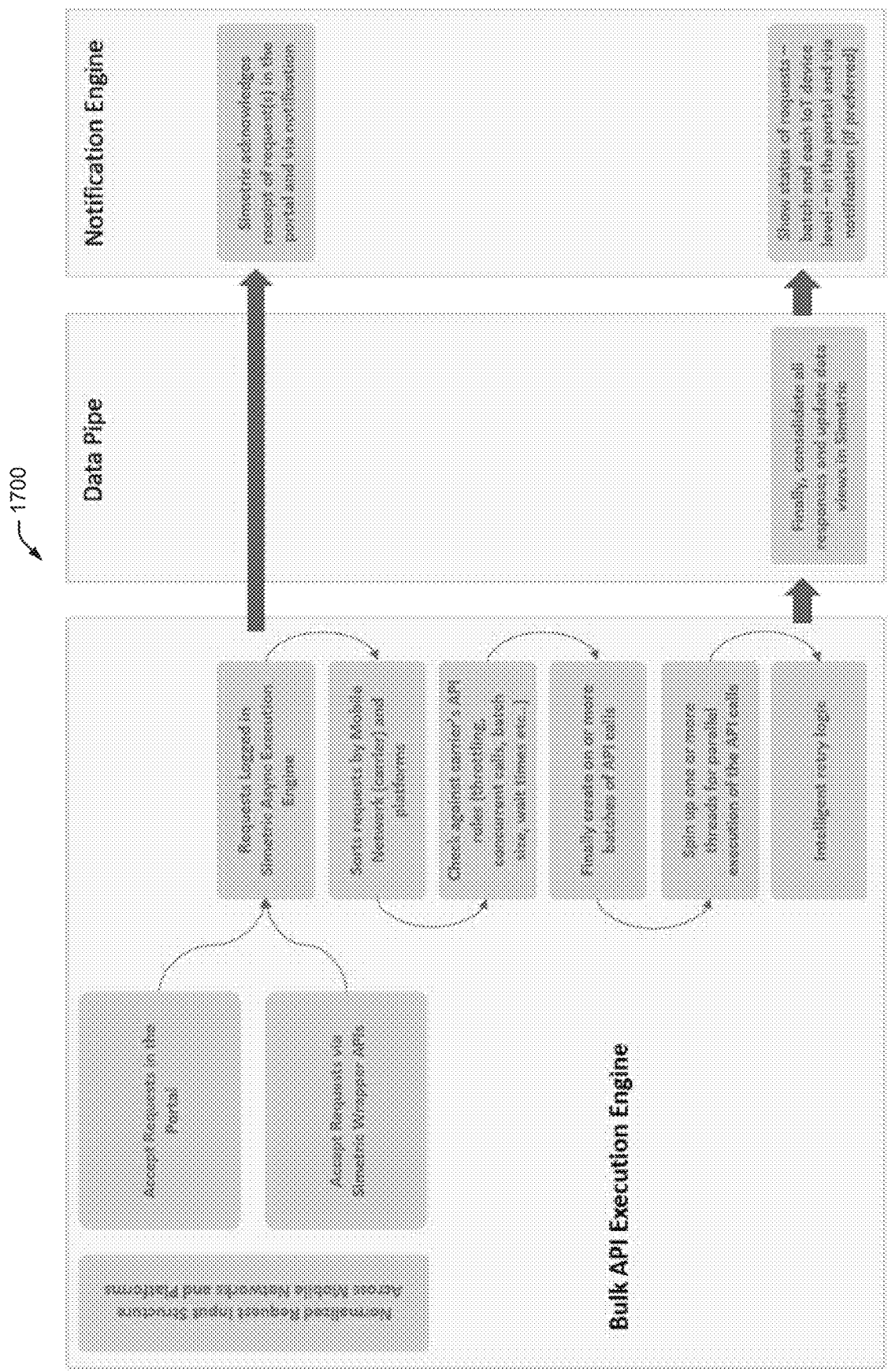
FIG. 17 illustrates an example embodiment of implementing a bulk API engine.

FIG. 17 illustrates an example embodiment of implementing 1700 a bulk API engine. The example of FIG. 17 also illustrates the interaction of the bulk API engine with a data pipe and a notification engine.

Figure 18:
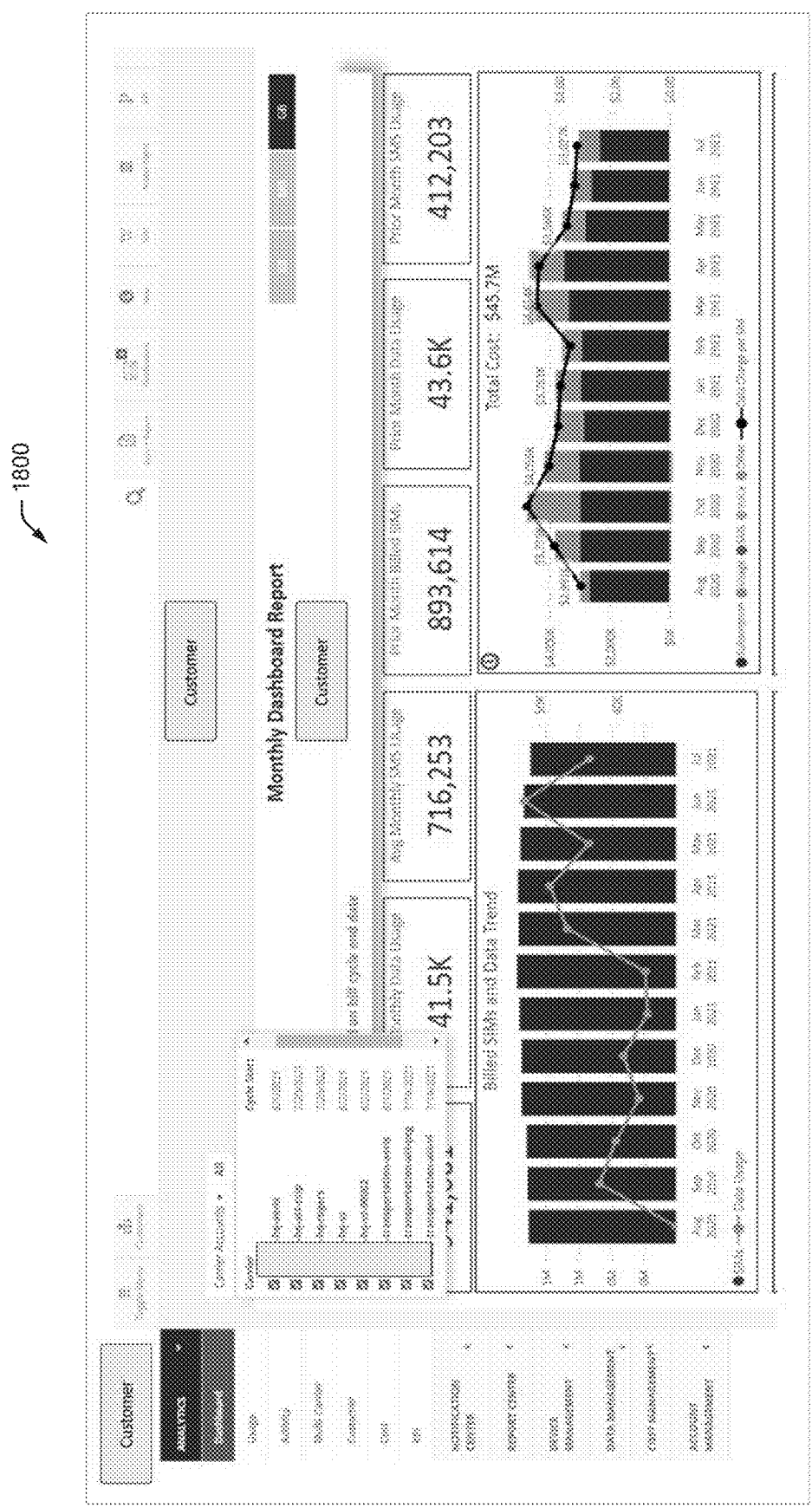
FIGS. 18-20 illustrate example embodiments of GUIs that present various information to a user of a device management system.
Figure 19:
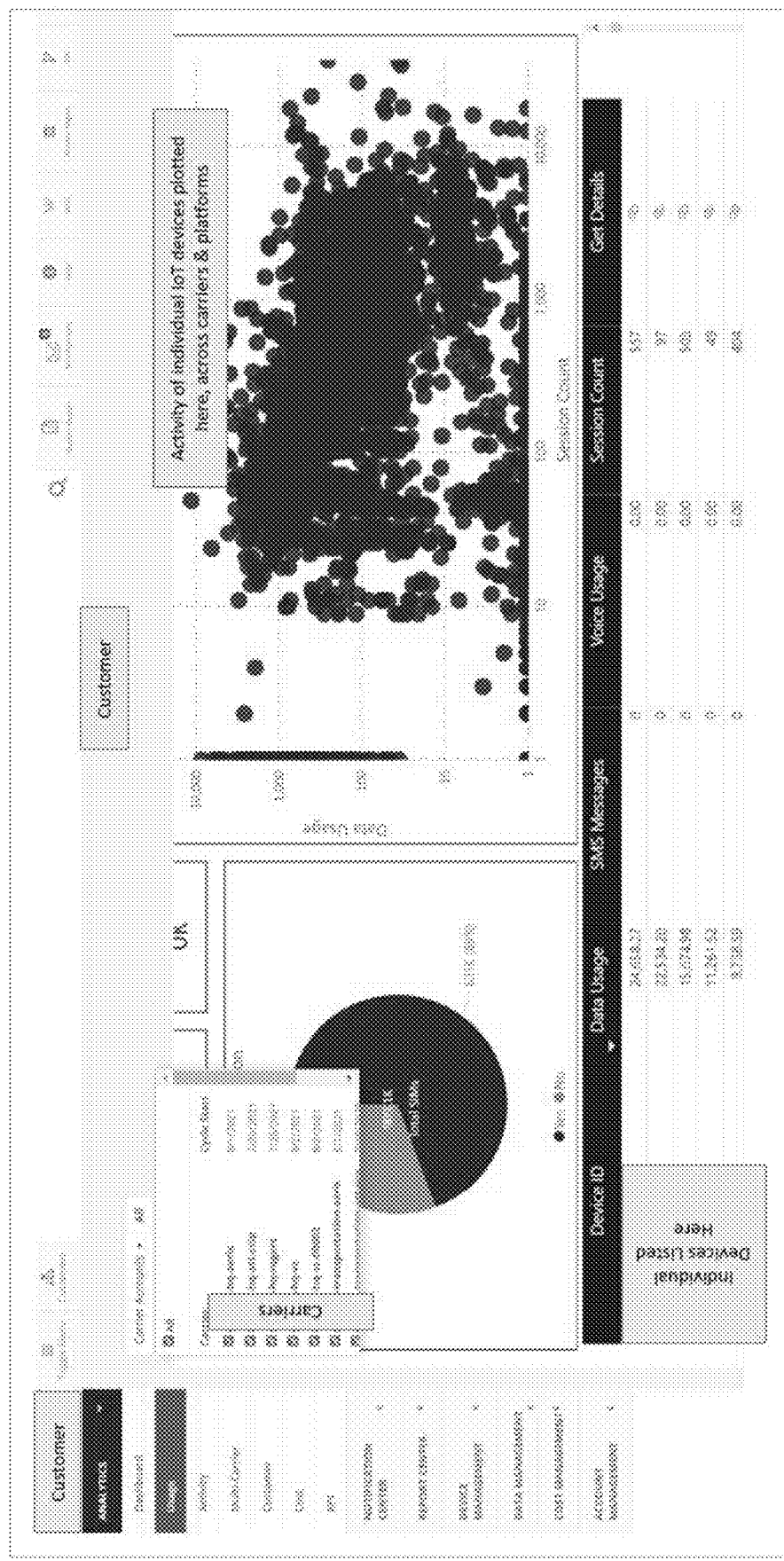
Figure 20:
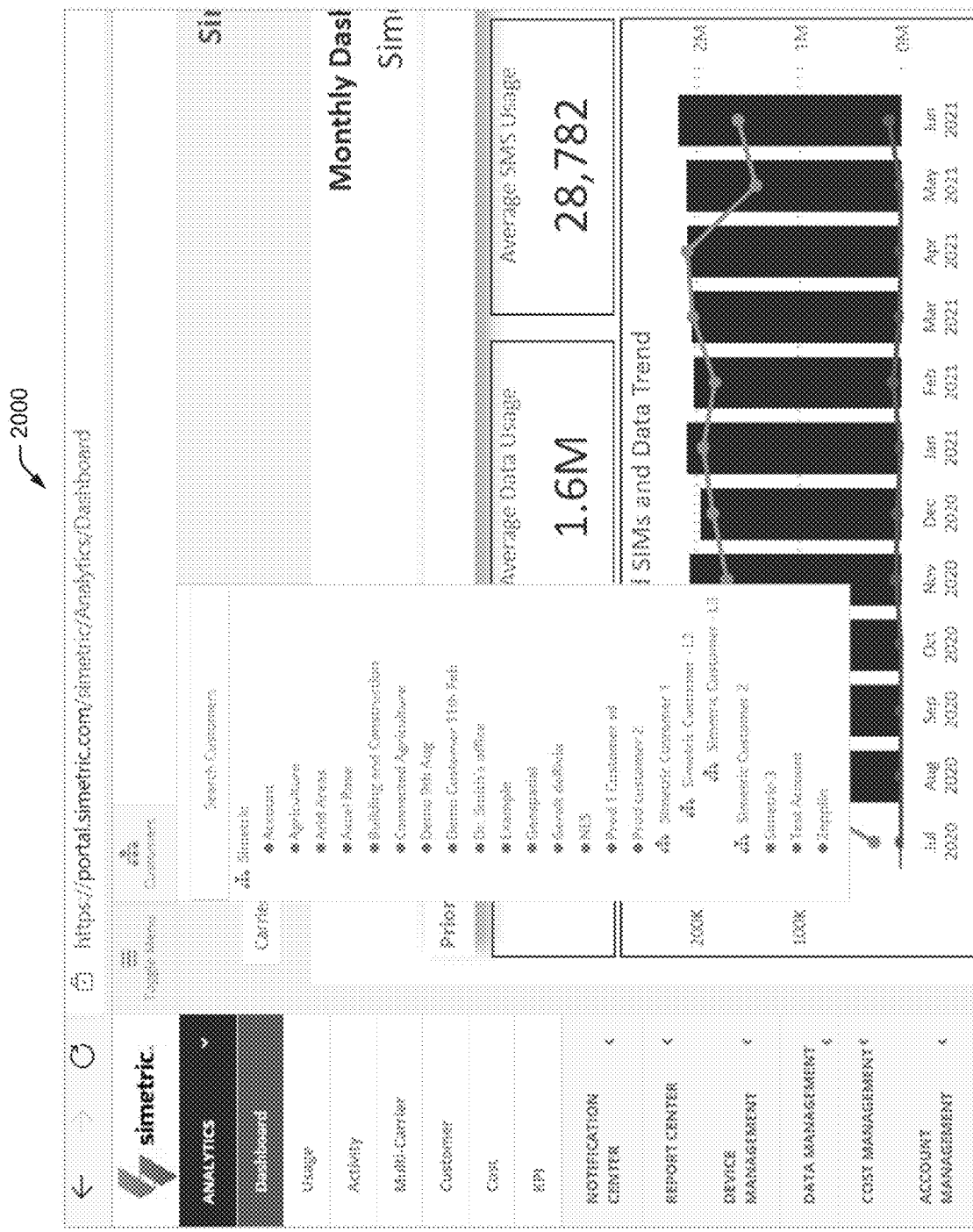

FIGS. 18-20 illustrate example embodiments of GUIs 1800, 1900, and 2000 that present various information to a user of a device management system. The example GUIs shown in FIGS. 18-20 may illustrate various billing data, usage data, device activity, average data usage, and the like. For example, GUI 1800 shows a dashboard format with various data that may be aggregated from multiple carriers, multiple platforms, multiple devices, and the like. In the example of FIG. 19, GUI 1900 illustrates a device-level snapshot of data. For example, GUI 1900 may allow a user to see all of their devices across multiple carriers or data platforms. In the example of GUI 2000 a user can create their own downstream customer hierarchy or intra company divisional/departmental hierarchy. In some embodiments, the data is aggregated across customers/divisions/departments such that the user can view all aggregated data or specific groups of data. In some implementations, GUI 2000 allows a user to drill down to specific IoT devices for more granular data. In some embodiments, queries can be built across one or many carriers and across one or many customers/divisions/departments.

Figure 21:
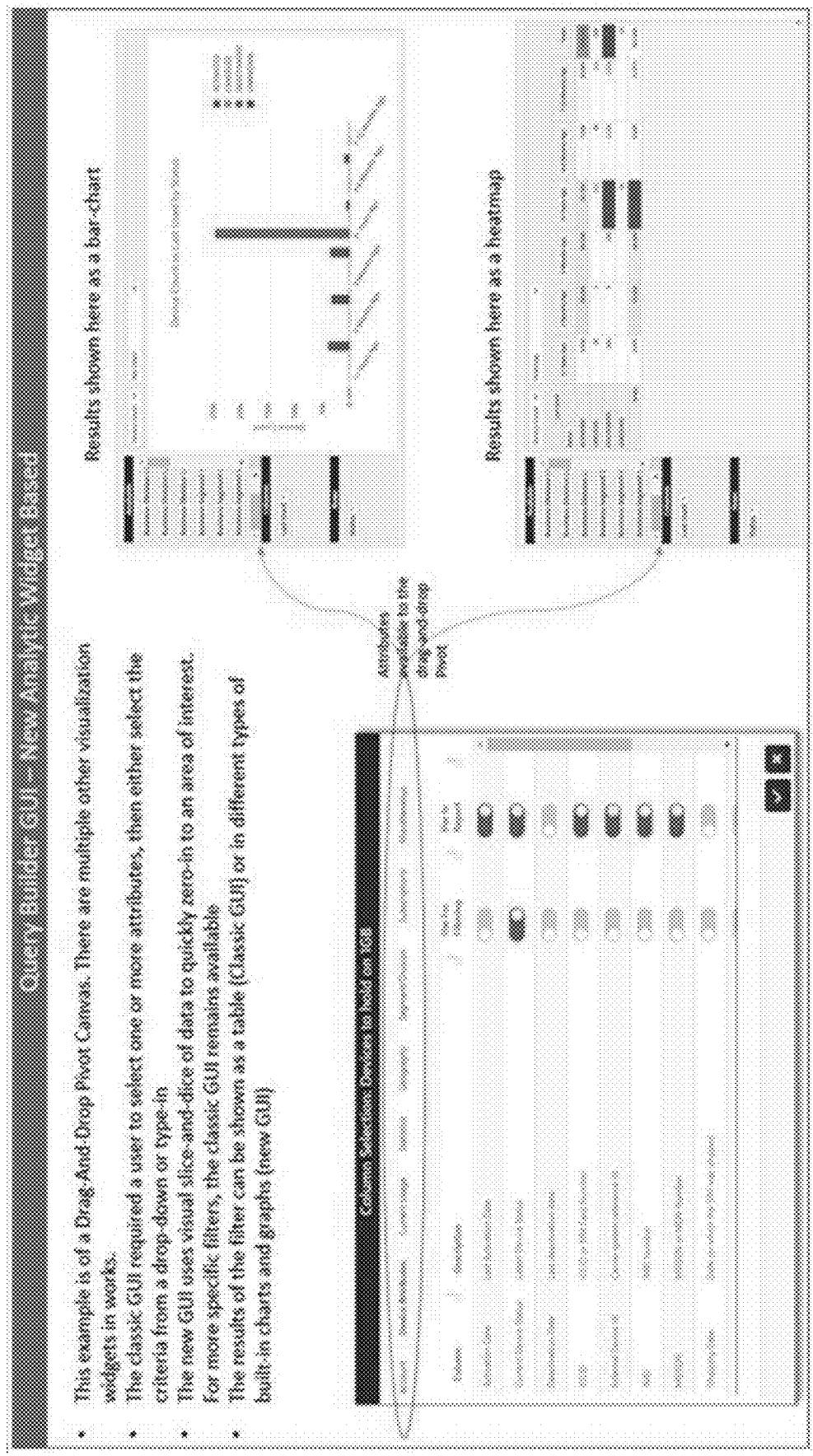
FIG. 21 illustrates an example embodiment of a GUI that may be used to build one or more queries.

FIG. 21 illustrates an example embodiment of a GUI 2100 that may be used to build one or more queries. In some implementations, GUI 2100 may support drag-and-drop building of queries and provide multiple options for displaying the results of one or more queries.

Figure 22:
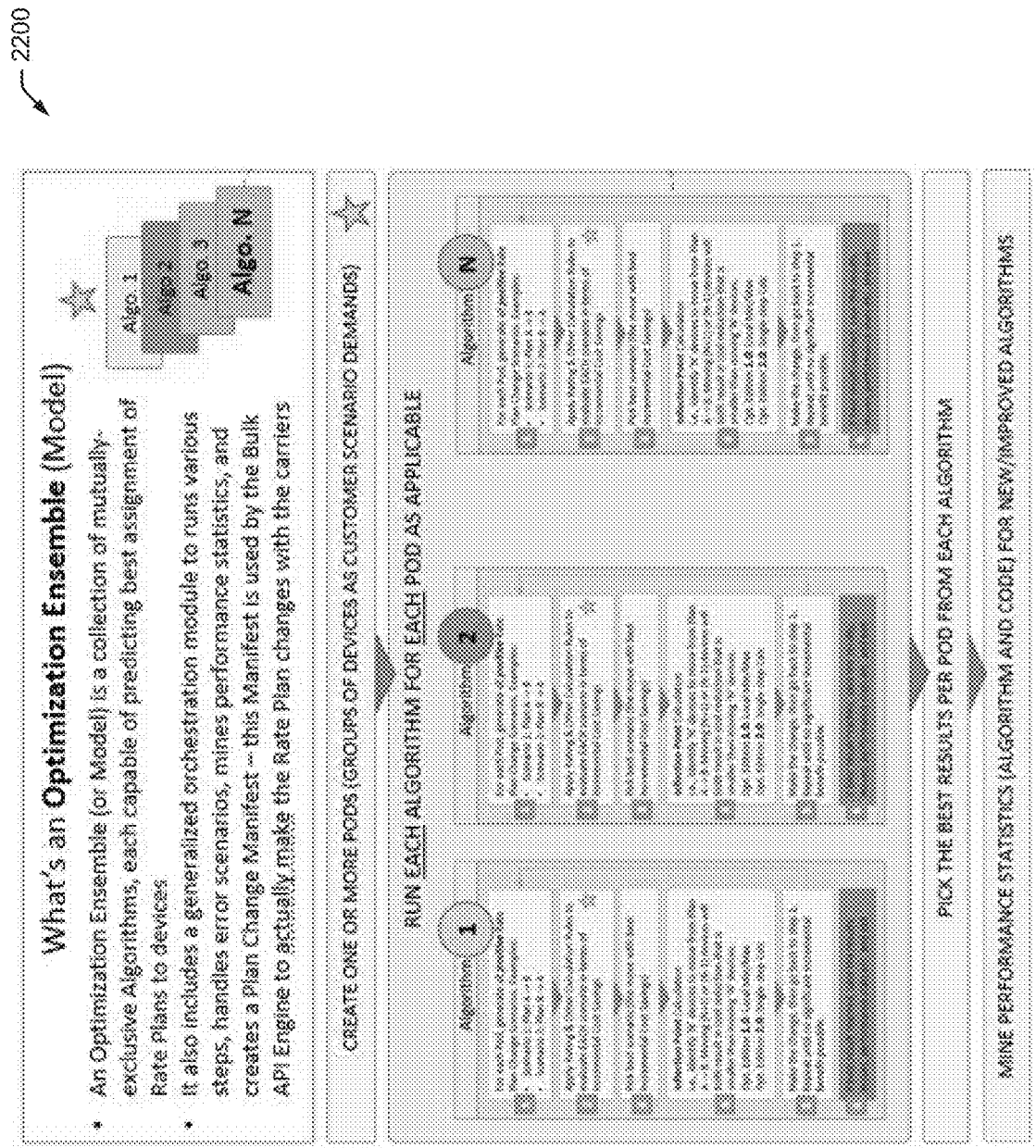
FIG. 22 illustrates an example embodiment of an optimization ensemble containing multiple pods.

FIG. 22 illustrates an example embodiment of an optimization ensemble 2200 containing multiple pods. In some implementations, optimization ensemble 2200 includes multiple mutually exclusive optimization engines that can collectively predict the best (e.g., lowest cost) rate plans for multiple devices. Optimization ensemble 2200 may also include a generalized orchestration module to execute various steps, handle error scenarios, mine performance statistics, and create a plan change manifest. The plan change manifest may be used by the bulk API engine to actually implement the rate plan changes with the carriers. Additional details regarding the operation of optimization ensemble 2200 are discussed herein, such as with respect to FIGS. 4A, 4B, and 5.

Interactive Query Builder

Innovation and consumer demand for new experiences are redefining business models—driving IoT strategies and complex, scaled deployments as the means to keeping-up and staying-up within hyper-competitive consumer environments. In the traditional IT sense, it is important for such deployments to offer a flexible, secure, and efficient base of connectivity, device and data management with standardization and automated processes. However, many IoT deployments are much more than the traditional business IT or network deployments. They are redefining business models which require real-time, intelligent insights not just the ingest of voluminous, fragmented and diverse data. The interactive query builder is built with the business owner in mind, re-engaging the business owners and IT partners with an operational, business performance-based view of deployments in that ever-complicated and continuous journey to business value. The interactive query builder informs today's execution and performance and also defines tomorrow's trajectory.

With the incorporation of 3rd party/enterprise business referential data, statistical profiling, and AI/ML, on enriched, correlated and normalized datasets, data is translated to information and insights with immediate accessibility to the non-technical business strategist via interactive query builder. Following are a few examples of how enriched data can drive real-time decision-making.

Industrial IoT is improving how factories operate. By using streaming data in real time, manufacturers with connected factories can respond faster to changing conditions, tune their operations for peak performance and maximize the value gained from factory investments. For example, in the industrial oil industry, IoT sensors and transducers are deployed to collect data. By utilizing cellular service, these devices can be connected to a gateway and from the gateway the data is then transmitted to the cloud. The described systems and methods can retrieve the data consumption information from each device directly from the carrier(s) or connectivity platform(s) through APIs including but not limited to carrier, rate plan, consumption trending and anomaly reporting, rate plans, cost, and optimization assessments, while recording and retaining device lifecycle history.

In some embodiments, devices may be segmented as defined by the end-user on attributes such as facilities, geographies and functional departments and/or activities including IoT application measures, reports, and notifications.

For example, the systems and methods described herein may enable a business to correlate disparate data across 1) connectivity, 2) device, and 3) device application to create one holistic storyline that transcends enterprise function and intent to drive more holistic strategies across business strategy and technology deployments.

In some industries, such as automotive and technology, companies are building a new generation of smart, connected vehicles. Not only are companies making cars safer to drive, they're also accessing and analyzing data directly from the vehicle to enhance customer experience, improve product development and manufacturing processes, and accelerate business performance.

In some situations, the retail industry has also been redefined based on shopper expectations of convenience, responsiveness, and personalization through both digital and physical means. Collecting, unifying, and managing customer data across multiple touch points is complex, but combining in-store data from IoT with digital customer data is valuable in the pursuit of personalizing the shopping experience.

The interactive query builder discussed herein provides an interface that allows users (including non-technical business users) to interact with various datasets in an interactive manner to locate and focus on data of interest. To use the interactive query builder, the user needs minimal training based on how to use the interface.

In some embodiments, the interactive query builder exposes attribute, fact, and measure columns to the users in an intuitive GUI with input controls that are meaningful for the selected columns. The actual query against the query catalogs is generated dynamically depending on the context and by leveraging a code-less, entirely configuration-based storage of rules. In some embodiments, the query catalogs are curated and enriched datasets that combine carrier datasets, user-created additional attributions as well as third party datasets. The query catalogs may also be tuned for intuitive, high-performance interactions by a non-technical business user.

In some examples, various types of raw data are received from one or more carriers. This raw data may include SIM inventory, device information, usage information, change history, account information, and the like. Curated data is created from the raw data and may be enriched based on custom tags and groups created by a user and further enriched based on third party data (e.g., data related to a manufacturer, hardware, network, operating system, programmability, geolocation, and the like).

One or more query catalogs are provided to the interactive query builder, which allow the interactive query builder to generate a response to one or more user queries. In some embodiments, the generated response is provided to a reporting engine and/or a notification engine, as discussed herein.

In some embodiments, the interactive query builder also includes enriched, correlated, and normalized datasets that cover multiple buckets: device information, life cycle history and usage data. The device information includes anything that describes an IoT or phone device, with the exception of life cycle history, connectivity, and usage information. The interactive query builder augments basic information received from carriers' data platform(s) with additional information provided by the users using a portal or API, third-party data related to device-type, hardware, networking and software specifications, and marketing terms. The systems and methods may also run standard and high-end statistical profiling of this information, which allows the systems and methods to add inferences to the device profile as additional attributions.

The life cycle history includes data associated with actions and events that are not tracked by the carriers. The described systems and methods record actions and events each time data is sourced from a carrier. This is accomplished by comparing the recently sourced data from the carrier with previously acquired data. In some embodiments, the data ingestion is continuous such that changes can be captured faster and are more precise as being associated with a smaller window of time. Further, the user can take additional actions that are not supported by carriers, such as: distributing a portfolio of devices into downline customers, geographic divisions, and functional departments. Users can also add group devices into watch list(s) and segments. If a user changes any of these additional characteristics, the described systems and methods can track the changes through a switch without requiring any additional code. Thus, a user can have full visibility into a device's life cycle as well as additional actions performed through the course of its life, by using the interactive query builder.

In some embodiments, the life cycle events that are tracked may include:

Deployment of a SIM chip (e.g., moving from inventory to use-ready)

Activation, end-of-life (EOL) and deactivation without EOL

Detaching from an actual physical device and attaching to a physical device

Change of phone number associated with the physical device

Moving of the SIM card from one billing account to another

Moving of the SIM card from one end customer to another

Moving of the SIM card from one carrier to another

Change in rate plans or service SKU(s) associated with a SIM card or phone number Change in attributions mastered by the systems and methods described herein Change in attributions based on statistical profiling Change in the primary location of operation (e.g., geo, network, etc.)

As used herein, "usage" broadly refers to the consumption of services provided by the carriers. The usage data may include data, SMS text, voice, and video. The usage data is typically provided by carriers for each SIM card/phone line as monthly aggregates, daily aggregates, or session-level data (CDR).

In some embodiments, monthly aggregates are billable records that have gone through the carrier's mediation and rating process. Daily aggregates and session data may include unmediated and unrated calls.

Additional slices are made available by some carriers, even though it is not consistent for the daily or monthly feeds. These additional slices include, for example, usage geo-location (e.g., country, country-region, network zone, etc.) and the direction (e.g., originating/outgoing, terminating/incoming, etc.), and in some cases more fine-grained information about the network itself (e.g., tower location, server IP, and the like).

The described systems and methods may also include refined use cases to determine which data feeds to use. For example, by using the pre-mediated and pre-rated information that comes as daily feeds, and adding forecasting techniques, it enables a user to run rate plan optimization early into the bill cycle to avoid future surprises. This approach is also useful in financial budgeting and inventory planning.

The systems and methods described herein may also include a data pipe that is implemented using inexpensive commodity storage and processing capability in the cloud that helps with the ingestion and processing of millions of records at speed. This approach is limited only by the carriers' capacity to respond to data requests. With CDRs, where the systems and methods receive the data for each call session, the systems and methods can rebuild daily and monthly aggregates for data slices that are otherwise missing from the raw daily and monthly feeds (e.g., geo-location, directionality, and the like).

The datasets generated and used by the systems and methods described herein have been normalized such that the dataset is agnostic of carriers, data platforms, voice vs. IoT, the type of service (e.g., data, voice, text, video, and the like), originating vs. terminating, charged vs. free, and many other dimensions and characterizations. This normalization of the datasets supports various features and activities associated with, and implemented by, the interactive query builder. These features include simplified UIs and GUIs that provide a quick display of information on a single screen. As the boundary between an IoT device and a phone becomes less clear, and with the advent of eSIM and 5G networks, the features offered by the interactive query builder become more useful and more valuable to the end user.

In some embodiments, dataset normalization includes aggregating data across all service contracts that a customer has with any number of carriers or other service providers. For example, a particular customer may have three accounts with Verizon and another account with AT&T. Using previous systems and methods, to view the data from the four different accounts, take any device management actions, or create summary analyses, the customer would need to login separately to each account of Verizon, and the sole account at AT&T, pull the data they need, collate and standardize the data before any summary reporting or analysis can be performed for finance, operations, or other departments. The systems and methods described herein provide an improved and more efficient approach. These systems and methods save significant costs related to systems integrations, maintaining those integrations as carriers release new features, and the inevitable personnel re-training and churn that follows.

Notification Engine

IoT adoption typically requires real-time or near-real-time data and processing to continuously assess anomalous activities within a multitude of parameters: fraud detection, network monitoring, e-commerce and risk management, network security, etc.

Using the statistical profiling discussed herein, the interactive query builder, and in combination with established business rules, set by the end-user, the data structures run predefined equations on the data while continuously seeking data patterns using sophisticated processing techniques.

Notifications and reporting are the simplest form of analytics—it's primary purpose to expose "events" relevant to the end-user by transforming complex data into useful summaries of insightful information, real-time.

Notifications and reporting can drive real-time awareness on IoT deployments by monitoring device scenarios, creating application workflows and actioning workflows via email or text alerts.

In some examples, an industrial IoT implementation may include an IoT sensor application that identifies an application failure. Concurrently, the systems and methods described herein identifies device status changes to "inactive" through pre-defined lifecycle notification triggers through its cellular carrier APIs. The described systems and methods may "activate" SIM status to re-engage cellular connectivity. An end-user IoT sensor application may reset and resume normal functions. This example reflects a real-time device "incident" identified through 1) the device sensor application and 2) cellular connectivity. In some embodiments, and without human interaction, connectivity troubleshooting identified the root-cause, re-engaged cellular service, and brought the device back on-line.

Additional applications include real-time usage analytics for pre-configured triggers and trending anomalies. Further applications may include creating and managing connectivity service plans on real-time or near-real-time device usage to optimize costs and assess service levels.

In some embodiments, a notification engine builds upon the datasets and the interactive query builder discussed herein. The notification engine is an important part of the systems and methods that provide automated device lifecycle management. When a user creates a custom alert to identify misbehaving devices, the user has two options: get notified of the misbehavior, or get notified and trigger an automated device management action. For example, when a device that was provisioned for domestic application suddenly starts tolling international roaming data, the user can automate deactivation of the device pending the user's investigation of the case so that charges can be avoided. In some embodiments, these misbehaving devices are identified using statistical anomaly detection, which may be part of continuous data processing systems and methods that enhance the automation of various business processes.

Ad-Hoc Reporting Engine

In some embodiments, an ad-hoc reporting engine (also referred to as a "reporting engine") builds upon the normalized datasets and the interactive query builder discussed herein. Users can interact with the datasets and interactively view and/or download the results (e.g., in Excel spreadsheet format) for deeper analysis. In some embodiments, users may choose to have reports delivered to a secure FTP location that only the user can access. This is particularly useful when the datasets (e.g., data results) are large. This feature can substantially reduce the time and money spent on a reporting infrastructure by carriers and users.

Figure 23:
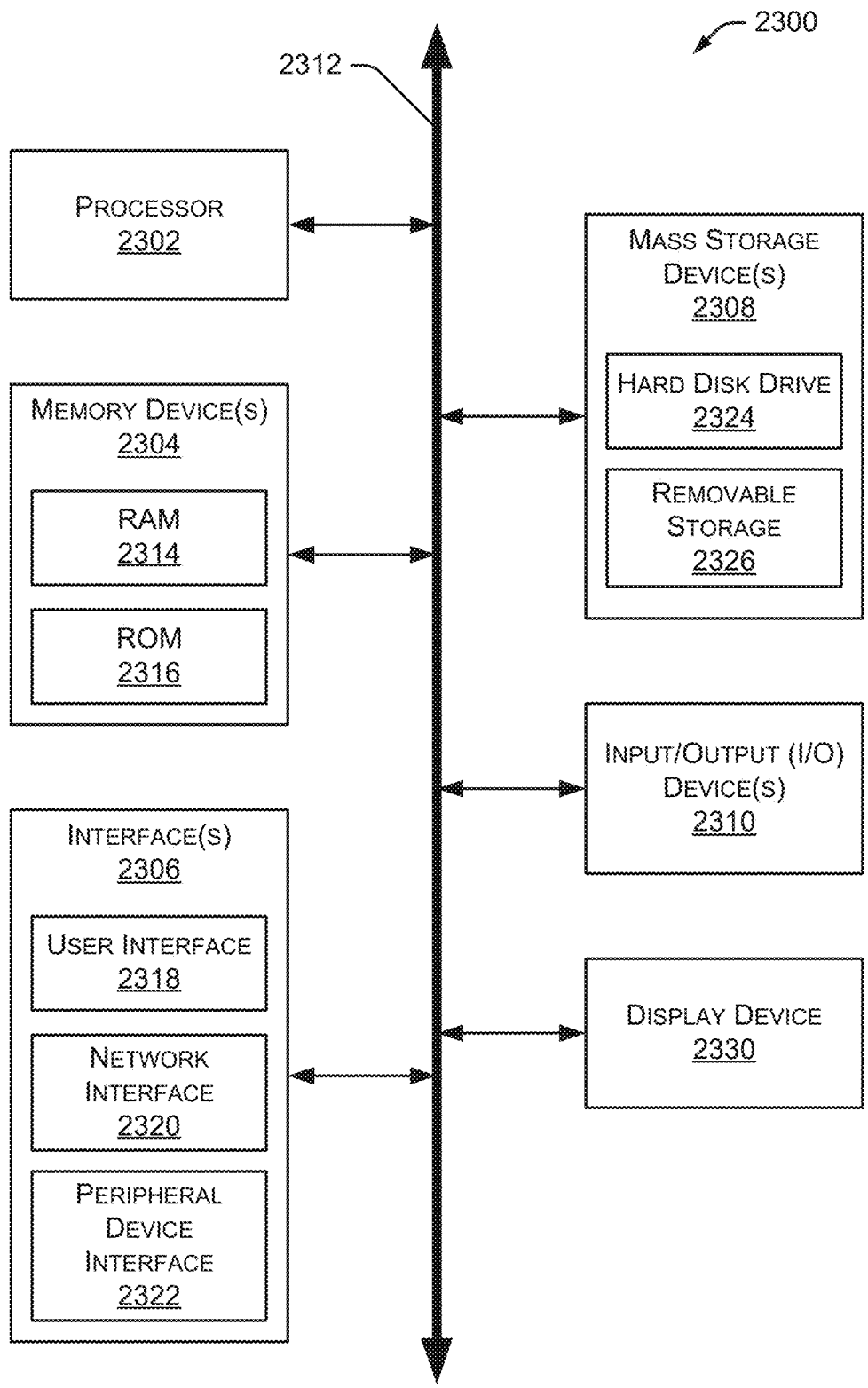
FIG. 23 illustrates an example block diagram of a computing device.

FIG. 23 illustrates an example block diagram of a computing device 2300 suitable for implementing the systems and methods described herein. In some embodiments, a cluster of computing devices interconnected by a network may be used to implement any one or more components of the systems discussed herein.

Computing device 2300 may be used to perform various procedures, such as those discussed herein. Computing device 2300 can function as a server, a client, or any other computing entity. Computing device can perform various functions as discussed herein, and can execute one or more application programs, such as the application programs described herein. Computing device 2300 can be any of a wide variety of computing devices, such as a desktop computer, a notebook computer, a server computer, a handheld computer, tablet computer and the like.

Computing device 2300 includes one or more processor(s) 2302, one or more memory device(s) 2304, one or more interface(s) 2306, one or more mass storage device(s) 2308, one or more Input/Output (I/O) device(s) 2310, and a display device 2330 all of which are coupled to a bus 2312. Processor(s) 2302 include one or more processors or controllers that execute instructions stored in memory device(s) 2304 and/or mass storage device(s) 2308. Processor(s) 2302 may also include various types of computer-readable media, such as cache memory.

Memory device(s) 2304 include various computer-readable media, such as volatile memory (e.g., random access memory (RAM) 2314) and/or nonvolatile memory (e.g., read-only memory (ROM) 2316). Memory device(s) 2304 may also include rewritable ROM, such as Flash memory.

Mass storage device(s) 2308 include various computer readable media, such as magnetic tapes, magnetic disks, optical disks, solid-state memory (e.g., Flash memory), and so forth. As shown in FIG. 23, a particular mass storage device is a hard disk drive 2324. Various drives may also be included in mass storage device(s) 2308 to enable reading from and/or writing to the various computer readable media. Mass storage device(s) 2308 include removable media 2326 and/or non-removable media.

I/O device(s) 2310 include various devices that allow data and/or other information to be input to or retrieved from computing device 2300. Example I/O device(s) 2310 include cursor control devices, keyboards, keypads, microphones, monitors or other display devices, speakers, printers, network interface cards, modems, lenses, CCDs or other image capture devices, and the like.

Display device 2330 includes any type of device capable of displaying information to one or more users of computing device 2300. Examples of display device 2330 include a monitor, display terminal, video projection device, and the like.

Interface(s) 2306 include various interfaces that allow computing device 2300 to interact with other systems, devices, or computing environments. Example interface(s) 2306 include any number of different network interfaces 2320, such as interfaces to local area networks (LANs), wide area networks (WANs), wireless networks, and the Internet. Other interface(s) include user interface 2318 and peripheral device interface 2322. The interface(s) 2306 may also include one or more user interface elements 2318. The interface(s) 2306 may also include one or more peripheral interfaces such as interfaces for printers, pointing devices (mice, track pad, etc.), keyboards, and the like.

Bus 2312 allows processor(s) 2302, memory device(s) 2304, interface(s) 2306, mass storage device(s) 2308, and I/O device(s) 2310 to communicate with one another, as well as other devices or components coupled to bus 2312. Bus 2312 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 2300, and are executed by processor(s) 2302. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A system comprising:
    one or more processors; and
    one or more non-transitory computer-readable media storing instructions executable by the one or more processors, wherein the instructions, when executed, cause the system to perform operations comprising:
        identifying a plurality of devices communicating in a carrier environment including a plurality of carriers, wherein each of the plurality of devices communicates via at least one Subscriber Identity Module (SIM) contained in each device, the plurality of devices being of a plurality of different types of services including voice, internet of things (IoT), data, video, and text;

receiving data related to the plurality of devices from the plurality of carriers, the data relating to the plurality of different types of services;

normalizing the data to be agnostic of the plurality of carriers and types of services;

analyzing the data to identify at least one risk associated with the plurality of devices, the at least one risk being at least one of a financial risk and a business risk;

responsive to identifying the at least one risk associated with the plurality of devices, identifying at least one action to mitigate the at least one risk;

implementing the at least one action to preemptively mitigate the at least one risk; and generating at least one notification to an administrator responsible for managing the plurality of devices.

2. The system of claim 1, wherein the at least one action to mitigate the at least one risk includes at least one of disabling a device, restarting a device, adding network services, removing network services, throttling a service, or managing a SIM state.

3. The system of claim 1, wherein the at least one notification includes at least one of an email, a push notification, or a short message service (SMS) message.

4. The system of claim 1, wherein the at least one notification includes an alert associated with the at least one action.

5. The system of claim 1, the operations further comprising communicating the at least one notification to at least one user(s) or system(s).

6. The system of claim 1, the operations further comprising one of:
async queueing of a message request until a particular time; or
sync queuing of the message request responsive to a successful completion or failure of an activity.

7. The system of claim 1, the operations further comprising selecting a template for use in composing a message associated with the at least one notification.

8. The system of claim 7, the operations further comprising retrieving at least one data element to complete the template.

9. The system of claim 8, the operations further comprising:
composing the message using the template and the at least one data element; and
sending the message to at least one recipient.

10. A method comprising:
identifying a plurality of devices communicating using a plurality of carriers, wherein each device of the plurality of devices communicates using at least one Subscriber Identity Module (SIM) contained in each device;
receiving data from the plurality of devices;
normalizing the data to be agnostic of the plurality of carriers;
analyzing the data to identify at least one risk associated with the plurality of devices, the at least one risk being at least one of a financial risk and a business risk;
responsive to identifying the at least one risk associated with the plurality of devices, identifying at least one action to mitigate the at least one risk;
implementing the at least one action to mitigate the at least one risk by generating a bulk application programming interface (API) call including generating API calls relating to the plurality of devices to the plurality of carriers;
consolidating responses to the API calls; and
generating at least one notification of the responses to the API calls to an administrator responsible for managing the plurality of devices.

11. The method of claim 10, wherein the at least one action to mitigate the at least one risk includes at least one of disabling a device, restarting a device, adding network services, removing network services, throttling a service, or managing a SIM state.

12. The method of claim 10, wherein generating the API calls relating to the plurality of devices to the plurality of carriers comprises, for each carrier of the plurality of carriers:
composing a portion of the API calls in a form expected by each carrier;
instantiating one or more threads corresponding to parallelization supported by each carrier; and
processing the portion of the API calls by the one or more threads throttled according to rules of each carrier.

13. The method of claim 10, wherein the at least one notification includes at least one of an email, a push notification, or a short message service (SMS) message.

14. The method of claim 10, wherein the at least one notification includes an alert associated with the at least one action.

15. The method of claim 10, further comprising one of:
async queueing of a message request until a particular time; or
sync queuing of the message request responsive to a successful completion or failure of an activity.

16. The method of claim 10, further comprising selecting a template for use in composing a message associated with the at least one notification.

17. One or more non-transitory computer-readable media storing instructions that, when executed, cause one or more processors to perform operations comprising:
identifying a plurality of devices communicating using a plurality of carriers, wherein each device of the plurality of devices communicates using at least one Subscriber Identity Module (SIM) contained in each device;
receiving data from the plurality of devices;
normalizing the data to be agnostic of the plurality of carriers;
analyzing the data to identify at least one risk associated with the plurality of devices, the at least one risk being at least one of a financial risk or a business risk;
responsive to identifying the at least one risk associated with the plurality of devices, identifying at least one action to mitigate the at least one risk;
implementing the at least one action to preemptively mitigate the at least one risk; and
generating at least one notification to an administrator responsible for managing the plurality of devices.

18. The one or more non-transitory computer-readable media of claim 17, wherein the at least one action to mitigate the at least one risk includes at least one of disabling a device, restarting a device, adding network services, removing network services, throttling a service, or managing a SIM state.

19. The one or more non-transitory computer-readable media of claim 17, wherein the at least one notification includes an alert associated with the at least one action.

* * * * *